(12) United States Patent
McGee et al.

(10) Patent No.: US 9,491,084 B2
(45) Date of Patent: Nov. 8, 2016

(54) MONITORING PATH CONNECTIVITY BETWEEN TEAMED NETWORK RESOURCES OF A COMPUTER SYSTEM AND A CORE NETWORK

(75) Inventors: Michael Sean McGee, Round Rock, TX (US); James R Walker, Austin, TX (US); Leonard J Falloon, Austin, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 1565 days.

(21) Appl. No.: 11/048,526

(22) Filed: Feb. 1, 2005

(65) Prior Publication Data
US 2005/0281191 A1   Dec. 22, 2005

Related U.S. Application Data

(60) Provisional application No. 60/580,509, filed on Jun. 17, 2004.

(51) Int. Cl.
| | |
|---|---|
| *H04L 12/701* | (2013.01) |
| *H04L 12/26* | (2006.01) |
| *H04L 12/707* | (2013.01) |
| *H04L 12/703* | (2013.01) |
| *H04L 12/753* | (2013.01) |
| *H04L 12/24* | (2006.01) |

(52) U.S. Cl.
CPC .......... *H04L 45/00* (2013.01); *H04L 41/0659* (2013.01); *H04L 43/0811* (2013.01); *H04L 45/22* (2013.01); *H04L 45/28* (2013.01); *H04L 45/48* (2013.01)

(58) Field of Classification Search
USPC ............... 370/216, 351, 252, 400, 408, 256
See application file for complete search history.

(56) References Cited

U.S. PATENT DOCUMENTS

| | | | | |
|---|---|---|---|---|
| 4,769,814 | A | * | 9/1988 | Bederman et al. ........... 370/402 |
| 5,088,091 | A | * | 2/1992 | Schroeder et al. ........... 370/406 |
| 5,260,945 | A | * | 11/1993 | Rodeheffer ........................ 714/4 |
| 5,448,723 | A | * | 9/1995 | Rowett ............................ 714/4 |
| 5,948,108 | A | * | 9/1999 | Lu et al. ........................ 714/4.1 |
| 5,959,968 | A | * | 9/1999 | Chin et al. .................... 370/216 |
| 6,032,194 | A | * | 2/2000 | Gai et al. ...................... 709/239 |
| 6,058,116 | A | * | 5/2000 | Hiscock et al. .............. 370/401 |

(Continued)

OTHER PUBLICATIONS

Virtual Router Reducncancy Protocol (RFC 2338) Knight et al. Apr. 1998.*

(Continued)

*Primary Examiner* — Bunjob Jaroenchonwanit
(74) *Attorney, Agent, or Firm* — Hewlett Packard Enterprise Patent Department

(57) ABSTRACT

A computer system monitors connectivity between a core network and two or more paths comprising a contiguous local area network segment. Each of the two or more paths couple at least one member of a team of network resources of the computer system to the core network. Each of the members of the team is configured to receive network management frames transmitted by one or more devices residing near or within the core network. A break in the connectivity between a path of the network segment and the core network is detected whenever the at least one member of the team coupled to that path fails to receive an expected one of the network management frames within a predetermined time period.

43 Claims, 14 Drawing Sheets

(56) References Cited

U.S. PATENT DOCUMENTS

| | | | | |
|---|---|---|---|---|
| 6,262,977 | B1* | 7/2001 | Seaman et al. | 370/256 |
| 6,314,525 | B1* | 11/2001 | Mahalingham et al. | 714/4.12 |
| 6,430,610 | B1* | 8/2002 | Carter | 709/221 |
| 6,594,776 | B1* | 7/2003 | Karighattam et al. | 714/4.12 |
| 6,934,263 | B1* | 8/2005 | Seaman | 370/256 |
| RE41,397 | E* | 6/2010 | Latif et al. | 709/226 |
| 2003/0035408 | A1* | 2/2003 | Hebert | 370/349 |
| 2003/0142680 | A1* | 7/2003 | Oguchi | 370/400 |
| 2003/0179707 | A1* | 9/2003 | Bare | 370/235 |
| 2003/0237018 | A1* | 12/2003 | Baba | 714/4 |
| 2005/0080923 | A1* | 4/2005 | Elzur | 709/238 |
| 2005/0163137 | A1* | 7/2005 | Wakumoto et al. | 370/406 |
| 2005/0259597 | A1* | 11/2005 | Benedetto et al. | 370/254 |
| 2006/0256767 | A1* | 11/2006 | Suzuki et al. | 370/351 |
| 2010/0177775 | A1* | 7/2010 | Gonda | 370/392 |

OTHER PUBLICATIONS

Cisco Hot Standby Router Protocol (RFC 2281) Li et al. Mar. 1998.*
Broadcom Netxtreme Gigabit Ethernet Adapter Users Guide, Feb. 26, 2003.*
Broadcom Netxtreme Gigabit Ethernet Teaming, Whitepaper, Jul. 9, 2003.*
Broadcom Gigabit Ethernet Teaming Services, Apr. 20, 2004.*
Teaming, definitions retrieved from internet, Feb. 4, 2004.*

* cited by examiner

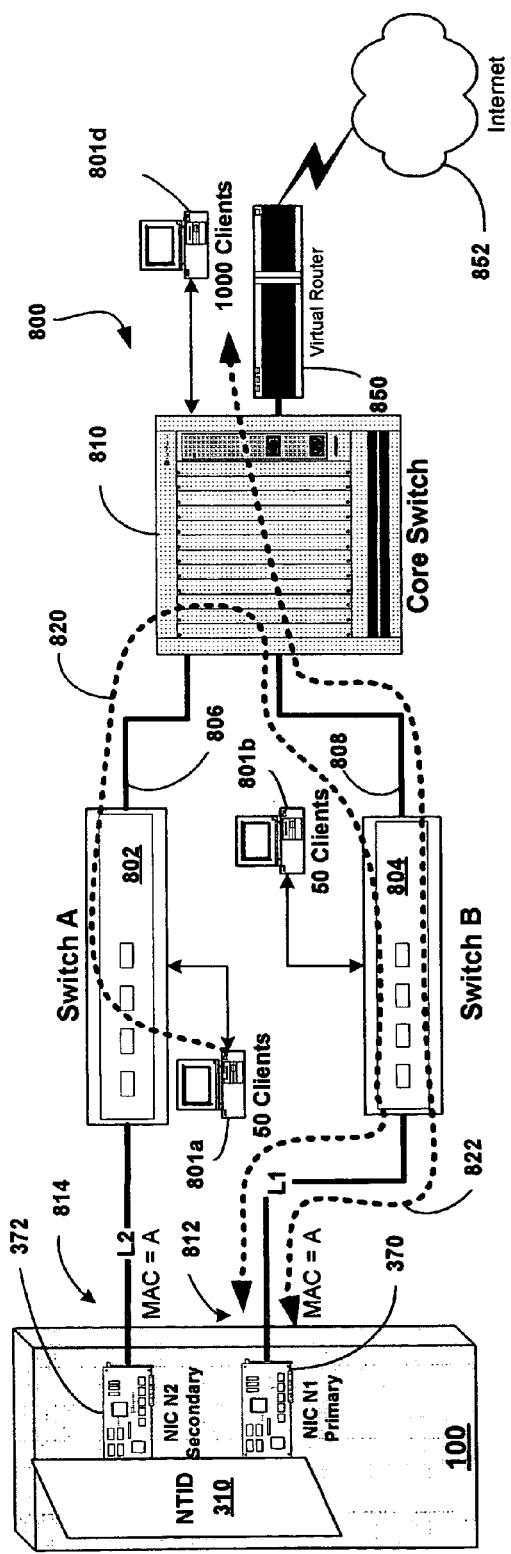
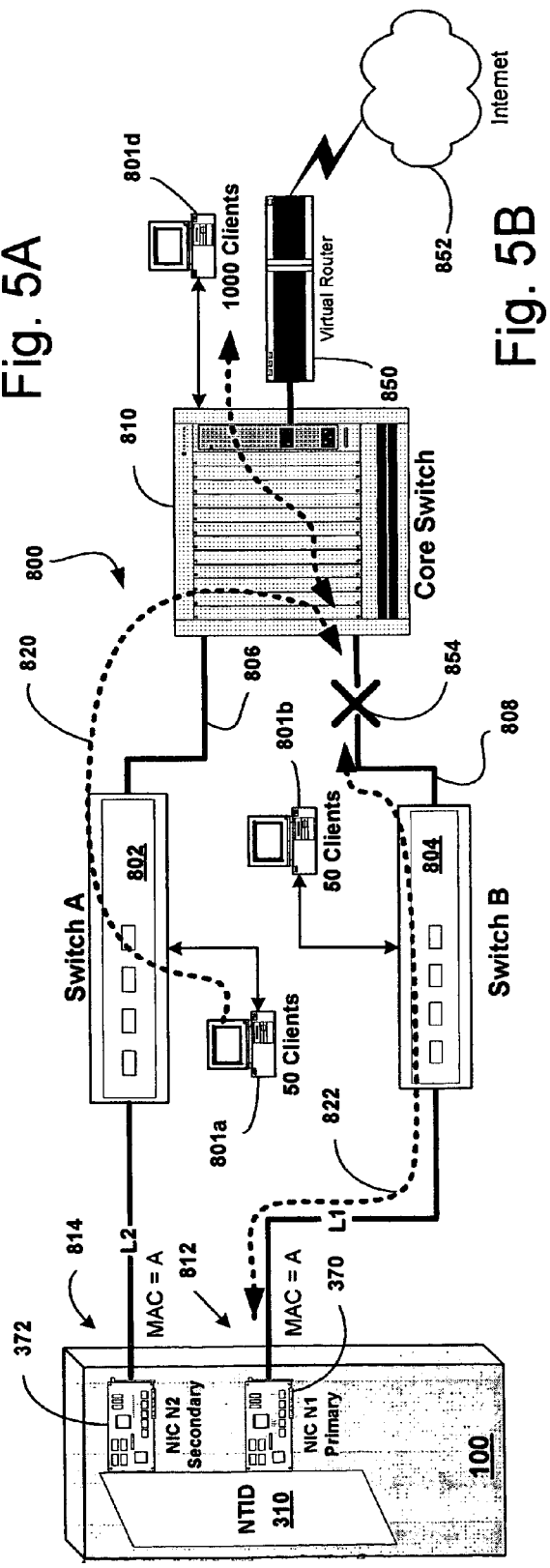
Fig. 5A
Fig. 5B

MONITORING PATH CONNECTIVITY BETWEEN TEAMED NETWORK RESOURCES OF A COMPUTER SYSTEM AND A CORE NETWORK

This application claims the benefit of U.S. Provisional Application No. 60/580,509, filed Jun. 7, 2004.

BACKGROUND

Computers and other devices are commonly interconnected to facilitate communication among one another using any one of a number of available standard network architectures and any one of several corresponding and compatible network protocols. The nature of standard architectures and their topologies is typically dictated at the first two layers of the OSI (Open Systems Interconnection) Basic Reference Model for networks, which are the physical layer (layer-1) and the data link layer (layer-2). One of the most commonly employed of such standard architectures is the Ethernet® network architecture. Other types of network architectures that are less widely used include ARCnet, Token Ring and FDDI.

Packet switched network protocols are commonly employed with a number of architectures such as the Ethernet® standard. These protocols are typically defined by layers 3 and 4 of the OSI and dictate the manner in which data to be transmitted between devices coupled to the network are formatted into packets for transmission. These protocols are independent of the architecture and topology by virtue of their separation as hierarchical layers of the OSI. TCP/IP is one example of a layer-4/layer-3 protocol combination typically used in Internet applications, or in intranet applications such as a local area network (LAN).

One of the most basic and widely implemented network types is the Local Area Network (LAN). In its simplest form, a LAN is a number of devices (e.g. computers, printers and other specialized peripherals) connected to one another by some form of signal transmission medium such as coaxial cable to facilitate direct peer-to-peer communication there between. A common network paradigm, often employed in LANs as well as other networks, is known as the client/server paradigm. This paradigm involves coupling one or more large computers (typically having very advanced processing and storage capabilities) known as servers to a number of smaller computers (such as desktops or workstations) and other peripheral devices shared by the computers known as clients. The clients send requests over the network to the one or more servers to facilitate centralized information storage and retrieval through programs such as database management and application programs stored on the server (s).

Network resources are required to couple computers and other devices to a network. These network resources are sometimes referred to as network adapter cards or network interface cards (NICs). An adapter card or NIC typically has at least one port through which a physical link is provided between the network transmission medium and the processing resources of the network device. Data from the processing resources of one network device is formatted (as packets in the case of packet switched networks) by its resident protocol layer and communicated through its network resources, over the coupling media to the network resources of a second network device. The received data is then deformatted by the protocol layer of the second network device and then presented to the processing resources of the second device. Network resources such as adapter cards or NICs are commercially available and are designed to support one or more variations of standard network architectures and known topologies.

It is now common to couple some or all of the devices of a network to a single network or subnet through redundant (i.e. teamed) network interface resources to improve the reliability and throughput of the network. These redundant links to the network may be provided as a plurality of single-port NICs, one or more NICs each having more than one port, or a combination thereof. Teaming of network interface resources is particularly common for servers, as the demand for throughput and reliability is normally greatest for servers on a network. Resource teams are typically two or more NICs or NIC ports logically coupled in parallel to appear as a single virtual network adapter to the other devices on the network. These resource teams can provide aggregated throughput of data transmitted to and from the network device employing the team and/or fault tolerance (i.e. resource redundancy to increase reliability). Throughput aggregation can be optimized by employing load-balancing between the teamed NICs or NIC ports.

Fault tolerant teams of network resources commonly employ two or more network adapters or NIC ports, with one port being "active" and designated as the "primary" while each of the other members of the team are placed in a "standby" or "inactive" mode and designated as "secondary" members of the team. A NIC or NIC port in standby mode remains largely idle (it is typically only active to the limited extent necessary to respond to system test inquiries to indicate to the team that it is still operational) until activated to replace the current primary adapter when it has failed. In this way, interruption of a network connection to a critical server may be avoided notwithstanding the existence of a failed network adapter card or port.

Load-balanced teams of network resources aggregate two or more network adapters or NICs to increase the throughput capacity of data traffic between the network and the device. In the case of "transmit" load-balancing (TLB) teams, all members of the team are typically in the active mode and data transmitted from the device to the network and is typically aggregated and balanced over all of the team members in accordance with some load-balancing policy. One of the active team members is still designated as the primary for the team, however, and it handles all of the data received by the team. In the case of "switch-assisted" load-balanced (SLB) teams, throughput is balanced over all active team members for data transmitted to the network as in TLB teams as well as data received by the team from the network. Typically, the received data is balanced with the support of a switch that is capable of performing load-balancing of data destined for the team in accordance with some load-balancing policy. Load-balanced teams also provide fault tolerance by default, as team members that cease to function as a result of a fault will be inactivated and the aggregated throughput of the team will be reduced as a result.

Certain network configurations are designed to achieve redundancy of devices such as routers and switches in the network. For a network device such as a server system employing a TLB or NFT team, such configurations can cause members of the team to be coupled to the network through a different one of the redundant devices and thus through separate paths of the network or subnet. To ensure that all team members are coupled to the same broadcast domain (i.e. same layer-2 network or subnet), these device-redundant configurations require that all of the redundant devices (and therefore the team members) ultimately be interconnected in some way—either directly or by way of uplinks—to a common third device (e.g. a backbone or core switch).

If one of the redundant devices (e.g. switches) coupling a team member to the network fails in such a configuration, the team will typically detect the resulting loss of connectivity to the network based on the resulting loss of link (among other detected conditions) that ensues for those NIC(s) of the team coupled to the network through that failed device. If the team member losing link is the primary of an NFT team or a TLB team, the entire team (and therefore the network device employing the team) loses communication with the network. When the team detects this loss of link to the network, it will typically fail over automatically in a manner which designates a different NIC of the team to be the primary and thereby restores team connectivity to the network. If the team member losing link with the network is an active but secondary member of a TLB team, no failover is required, but the team member will be placed in an inactive mode and will no longer be able to transmit load-balanced packets to the network until the failed switch has been restored.

It is also possible, for this type of redundant configuration to suffer a failure in an uplink to the backbone or common core switch for example, rather than one of the redundant devices that couples the NICs of the team to the network. In this type of failure, various team members can become isolated from one another on newly created LAN segments such that they are no longer contiguous with the segment to which the primary NIC of the team is coupled. Thus, a simple failover mechanism such as that described above will typically not serve to restore full connectivity to the team (and therefore the server) for all clients on the network. Moreover, automatic failover mechanisms such as the one described above typically require that a loss of physical link to the network be detected for at least one of the team members as a condition for the mechanism to even be triggered. Although failure in an uplink to the core can isolate various team members from one another on newly created segments and thereby degrade the team's connectivity with the core network, a team member coupled to an isolated segment may still maintain physical link with its segment and would not necessarily trigger a traditional failover.

When a failure occurs as described above, clients on secondary network paths (i.e. paths coupled to members of the team that are designated as secondary and not to the NIC designated as primary) will no longer be able to communicate with the network if they become isolated from the primary network path (the path of the original network to which the primary team member is coupled). This is because NFT and TLB teams receive data for the entire team only through the member designated as primary (for the NFT team, the primary transmits data for the entire team as well). Because there is typically only one primary member per team, only a path still contiguous with the primary path (the path coupled to the primary team member) will still have communication with the team and therefore the server employing the team. If the failure occurs in an uplink coupling the core to the primary path, the server employing the team becomes isolated from the core network as well as those network devices coupled to the secondary paths. Under these circumstances, if a router is provided as part of the core network by which the server communicates with the Internet (e.g. a gateway), the team (and therefore the system that employs it) becomes unable to communicate with the Internet as well.

SUMMARY OF THE INVENTION

An embodiment of a method of monitoring connectivity between a core network and two or more paths comprising a contiguous local area network segment is disclosed. Each of the two or more paths couple at least one member of a team of network resources of a computer system to the core network. Each of the members of the team is configured to receive network management frames transmitted by one or more devices residing near or within the core network. A break in the connectivity between a path of the network segment and the core network is detected whenever the at least one member of the team coupled to that path fails to receive an expected one of the network management frames within a predetermined time period.

BRIEF DESCRIPTION OF THE DRAWINGS

For a detailed description of embodiments of the invention, reference will now be made to the accompanying drawings in which:

FIG. 5A is a network diagram illustrating a local area network segment to which a computer system is coupled that features an embodiment of the invention;

FIG. 5B is the network diagram of FIG. 5A illustrating the effect of a failure in a switch uplink in one of the various paths in the network segment;

NOTATION AND NOMENCLATURE

Certain terms are used throughout the following description and in the claims to refer to particular features, apparatus, procedures, processes and actions resulting therefrom. For example, the term network resources is used to generally denote network interface hardware such as network interface cards (NICs) and other forms of network adapters known to those of skill in the art. Moreover, the term NIC or network adapter may refer to one piece of hardware having one port or several ports. While effort will be made to differentiate between NICs and NIC ports, reference to a plurality of NICs may be intended as a plurality of interface cards or as a single interface card having a plurality of NIC ports. Those skilled in the art may refer to an apparatus, procedure, process, result or a feature thereof by different names. This document does not intend to distinguish between components, procedures or results that differ in name but not function. In the following discussion and in the claims, the terms "including" and "comprising" are used in an open-ended fashion, and thus should be interpreted to mean "including, but not limited to . . . ."

DETAILED DESCRIPTION

The following discussion is directed to various embodiments of the invention. Although one or more of these embodiments may be preferred, the embodiments disclosed should not be interpreted as, or otherwise be used for limiting the scope of the disclosure, including the claims, unless otherwise expressly specified herein. In addition, one skilled in the art will understand that the following description has broad application, and the discussion of any particular embodiment is meant only to be exemplary of that embodiment, and not intended to intimate that the scope of the disclosure, including the claims, is limited to that embodiment. For example, while the various embodiments may employ one type of network architecture and/or topology, those of skill in the art will recognize that the invention(s) disclosed herein may be readily applied to all other compatible network architectures and topologies.

Figure 1:
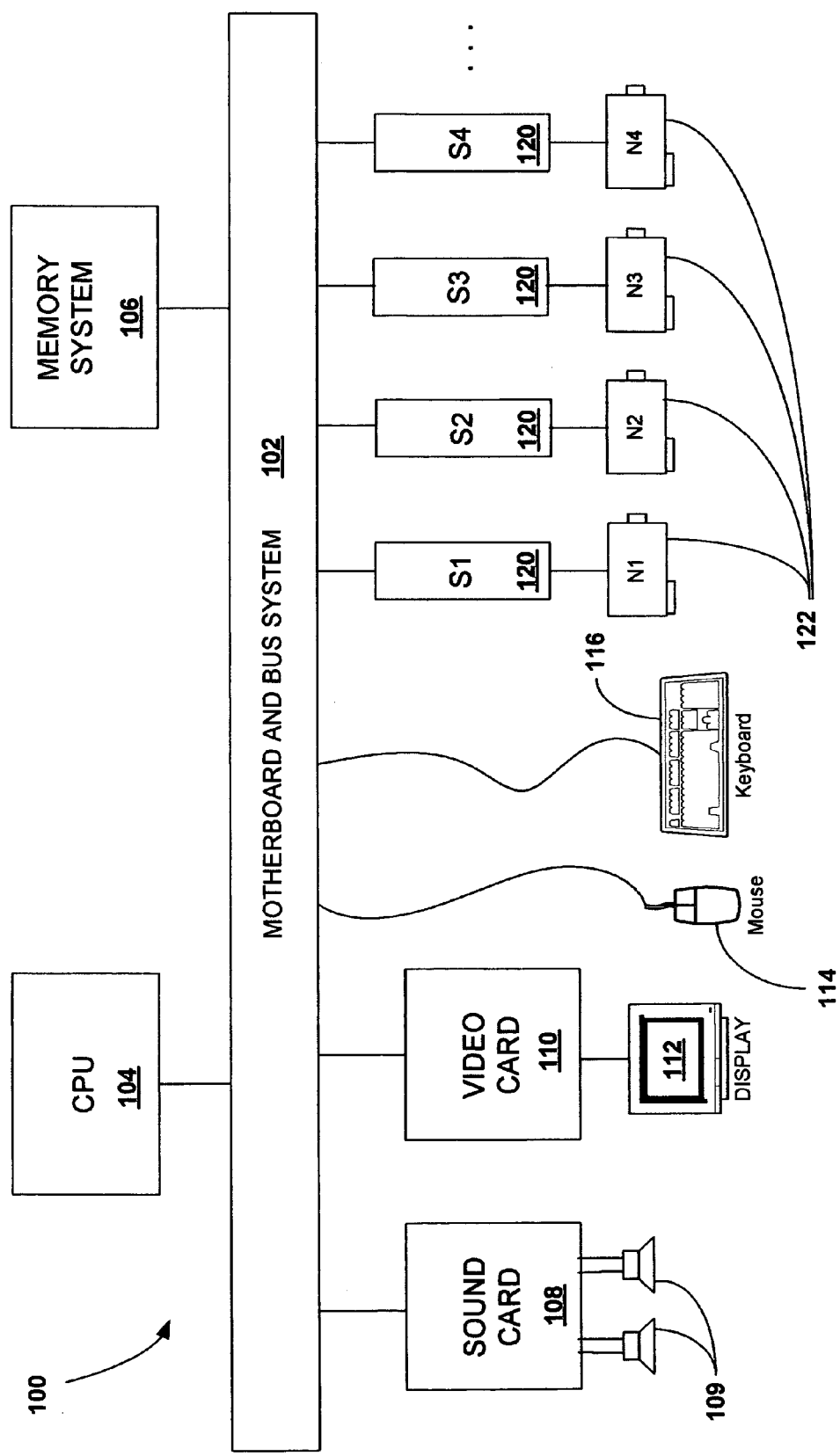
FIG. 1 is a block diagram that illustrates various features of a computer system, including some features by which the computer system is coupled to a network in accordance with an embodiment of the present invention.

FIG. 1 is a block diagram of a computer system 100 that illustrates various features of a computer system 100 that may be used to couple it to a network in accordance with an embodiment of the present invention. The computer system 100 can be an IBM-compatible, personal computer (PC) system or the like, and may include a motherboard and bus system 102 coupled to at least one central processing unit (CPU) 104, a memory system 106, a video card 110 or the like, a mouse 114 and a keyboard 116. The motherboard and bus system 102 can be any kind of bus system configuration, such as any combination of the following: a host bus, one or more peripheral component interconnect (PCI) buses, an industry standard architecture (ISA) bus, an extended ISA (EISA) bus, a microchannel architecture (MCA) bus, etc. Also included but not shown are bus driver circuits and bridge interfaces, etc., as are known to those skilled in the art.

The CPU 104 can be any one of several types of microprocessors and can include supporting external circuitry typically used in PCs. The types of microprocessors may include the 80486, Pentium®, Pentium II®, etc. all microprocessors from Intel Corp., or other similar types of microprocessors such as the K6® microprocessor by Advanced Micro Devices. Pentium® is a registered trademark of Intel Corporation and K6® is a registered trademark of Advanced Micro Devices, Inc. The external circuitry can include one or more external caches (e.g. a level two (L2) cache or the like (not shown)). The memory system 106 may include a memory controller or the like and may be implemented with one or more memory boards (not shown) plugged into compatible memory slots on the motherboard, although any memory configuration is contemplated. The CPU 104 may also be a plurality of such processors operating in parallel.

Other components, devices and circuitry may also be included in the computer system 100 that are not particularly relevant to embodiments of the present invention and are therefore not shown for purposes of simplicity. Such other components, devices and circuitry are typically coupled to the motherboard and bus system 102. The other components, devices and circuitry may include an integrated system peripheral (ISP), an interrupt controller such as an advanced programmable interrupt controller (APIC) or the like, bus arbiter(s), one or more system ROMs (read only memory) comprising one or more ROM modules, a keyboard controller, a real time clock (RTC) and timers, communication ports, non-volatile static random access memory (NVSRAM), a direct memory access (DMA) system, diagnostics ports, command/status registers, battery-backed CMOS memory, etc. Although the present invention is illustrated with an IBM-compatible type PC system, it is understood that the present invention is applicable to other types of computer systems and processors as known to those skilled in the art.

The computer system 100 may further include one or more output devices, such as speakers 109 coupled to the motherboard and bus system 102 via an appropriate sound card 108, and monitor or display 112 coupled to the motherboard and bus system 102 via an appropriate video card 110. One or more input devices may also be provided such as a mouse 114 and keyboard 116, each coupled to the motherboard and bus system 102 via appropriate controllers (not shown) as is known to those skilled in the art. Other input and output devices may also be included, such as one or more disk drives including floppy and hard disk drives, one or more CD-ROMs, as well as other types of input devices including a microphone, joystick, pointing device, etc. The input and output devices enable interaction with a user of the computer system 100 for purposes of configuration, as further described below.

The motherboard and bus system 102 is typically implemented with one or more expansion slots 120, individually labeled S1, S2, S3, S4 and so on, where each of the slots 120 is operable to receive compatible adapter or controller cards configured for the particular slot and bus type. Typical devices configured as adapter cards include network interface cards (NICs), disk controllers such as a SCSI (Small Computer System Interface) disk controller, video controllers, sound cards, etc. The computer system 100 may include one or more of several different types of buses and slots known to those of skill in the art, such as PCI, ISA, EISA, MCA, etc. In an embodiment illustrated in FIG. 1, a plurality of NIC adapter cards 122, individually labeled N1, N2, N3 and N4 are shown coupled to the respective slots S1-S4. The bus implemented for slots 120 and the NICs 122 is typically dictated by the design of the adapter card itself As described more fully below, each of the NICs 122 enables the computer system to communicate through at least one port with other devices on a network to which the NIC ports are coupled. The computer system 100 may be coupled to at least as many networks as there are NICs (or NIC ports) 122. When multiple NICs or NIC ports 122 are coupled to the same network as a team, each provides a separate and redundant link to that same network for purposes of load balancing and/or fault tolerance. Additionally, two or more of the NICs (or NIC ports) 122 may be split between distinct paths or segments of a network that ultimately connect to a core switch.

If employed in a packet-switched network, each of the NICs 122 (N1-N4) of FIG. 1 transmits to and receives from the network, packets (e.g. Ethernet® formatted packets or the like) generated by the processing resources of the transmitting network device. The formatting of the packets is defined by the chosen transmission protocol as previously discussed. It will be understood by those skilled in the art that each device on a network uses one or more unique addresses by which it communicates with the other devices on the network. Each address corresponds to one of the layers of the OSI model and is embedded in the packets for both the source device as well as the destination device. Typically, a device will use an address at layer-2 (the data link layer) known as a MAC (media access control) address and an address at layer-3 (the network layer) known as a protocol address (e.g. IP, IPX AppleTalk, etc.). The MAC address can be thought of as being assigned to the physical hardware of the device (i.e. the adapter or NIC port providing the link to the network) whereas the protocol address is assigned to the software of the device. When multiple protocols reside on the same network device, a protocol address is usually assigned to each resident protocol.

For Ethernet® networks, devices communicate directly using their respective MAC (i.e. layer-2) addresses, even though the software for each device initiates communication with one or more other network devices using their protocol addresses. Ethernet® devices must first ascertain the MAC address corresponding to a particular protocol address identifying a destination device. For the IP protocol, this is accomplished by first consulting a cache of MAC address/protocol address pairs maintained by each network device. If an entry for a particular protocol address is not there, a process is initiated whereby the sending device broadcasts a request to all devices on the network for the device having the destination protocol address to send back its MAC address. This is known as ARP (address resolution protocol), the result of which is then stored in the cache. The packets are then formed by embedding the source and destination addresses, which are at least 48 bits, as well as embedding the source and destination IP addresses in the payload of the packet so that the receiving device knows to which device to respond. For the IPX protocol, the ARP process is not required because the MAC address is a constituent of the IP address.

There are three types of layer-2 and layer-3 addresses. A directed or unicast packet includes a specific destination address that corresponds to a single network device. A multicast address corresponds to a plurality of devices on a network, but not all of them. A broadcast address, used in the ARP process for example, corresponds to all of the devices on the network. A broadcast bit is set for broadcast packets, where the destination address is all ones (1's). A multicast bit in the destination address is set for multicast packets.

Figure 2:
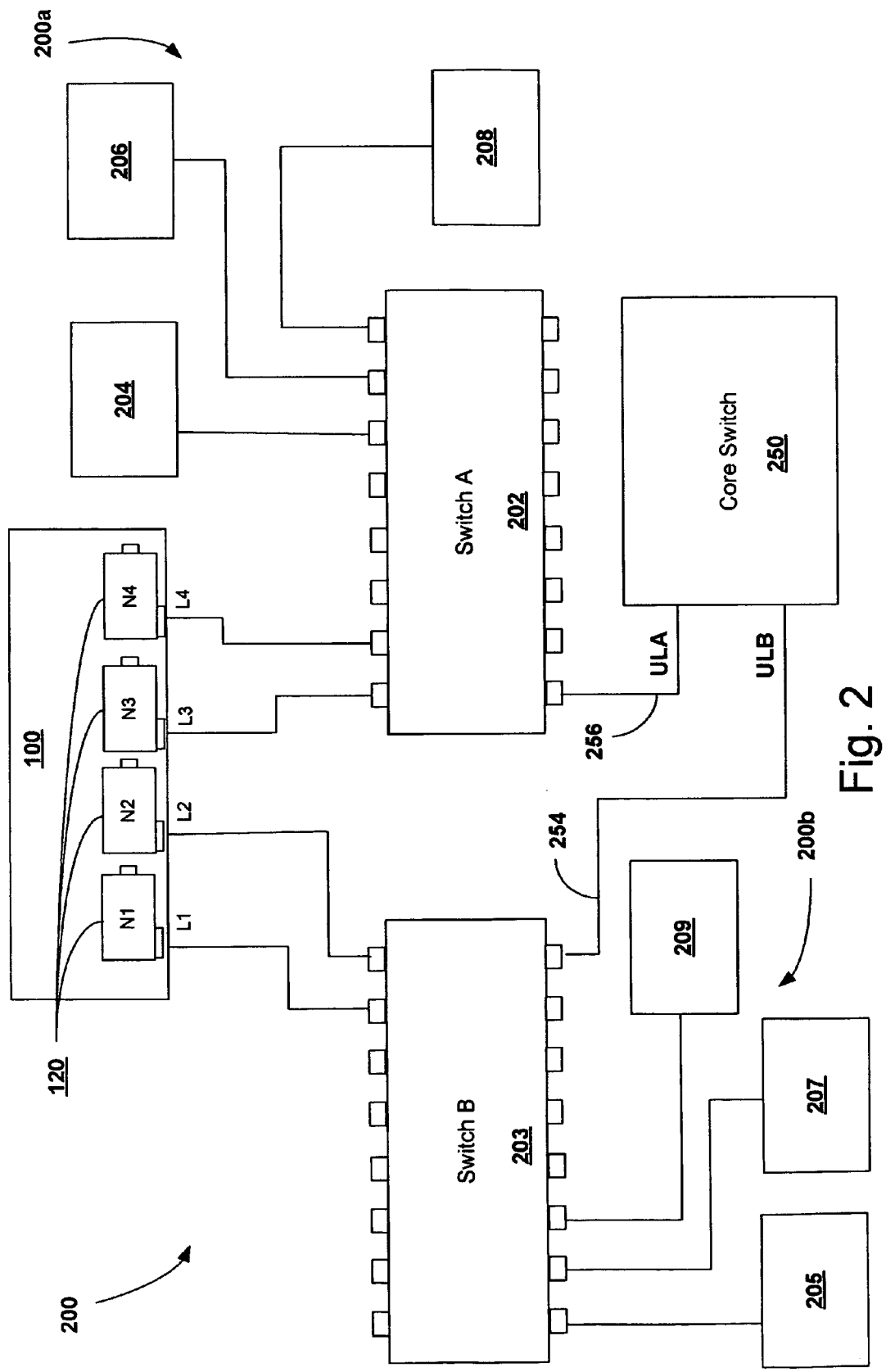
FIG. 2 is a block diagram of a network that illustrates some features that may be used to couple the computer system of FIG. 1 to the network in accordance with an embodiment of the present invention.

Referring now to FIG. 2, a block diagram of a local area network 200 that includes two contiguous paths 200a and 200b to core switch 250 is shown. Computer system 100 communicates with one or more other devices, such as devices 204, 206, and 208 through network device 202 over path 200a and devices 205, 207, 209 through network device 203 over path 200b. The devices 204 through 209 may be of any type, such as another computer system, a printer or other peripheral device, or any type of network device, such as a hub, a repeater, a router, a brouter, etc. Multiple port network devices 202, 203 can be for example a concentrator, hub, switch or the like.

The computer system 100 is coupled to ports of the network device Switch A 202 by way of links L3 and L4. The computer system 100 is further coupled to the network device Switch B 203 via links L1 and L2. The NICs N1-N4 are shown to provide one NIC port (and thus one link) each. As previously discussed, these NICs may also be multi-port devices or a combination of both single and multi-port NICs. It is noted that the computer system 100 may be coupled to the network devices 202, 203 via any number of links from one to some maximum number such as sixteen (16), primarily limited by the number of expansion slots available.

The network 200 of FIG. 2 illustrates the coupling of teamed interface resources of the computer system 100 to two or more redundant links to a contiguous network segment that includes the two paths 200a, 200b. The team members are each coupled to common core switch 250 through redundant switches A 202 and B 203. The switches A 202 and B 203 provide additional redundancy in the network.

The example of FIG. 2 further illustrates the members of the team (i.e. ports P1-P4) split equally between the two paths of the segment. The team of ports P1-P4 can provide benefits including load balancing and/or fault tolerance, depending upon whether the team is configured to be a TLB or NFT team respectively. The key to teaming two or more NIC ports is to make the team look like a single virtual interface resource or virtual port to the other devices (i.e. devices 202-209) on the same network or sub-network. This is typically accomplished by assigning one primary MAC address and one protocol (e.g. IP) address to the entire team.

Figure 3:
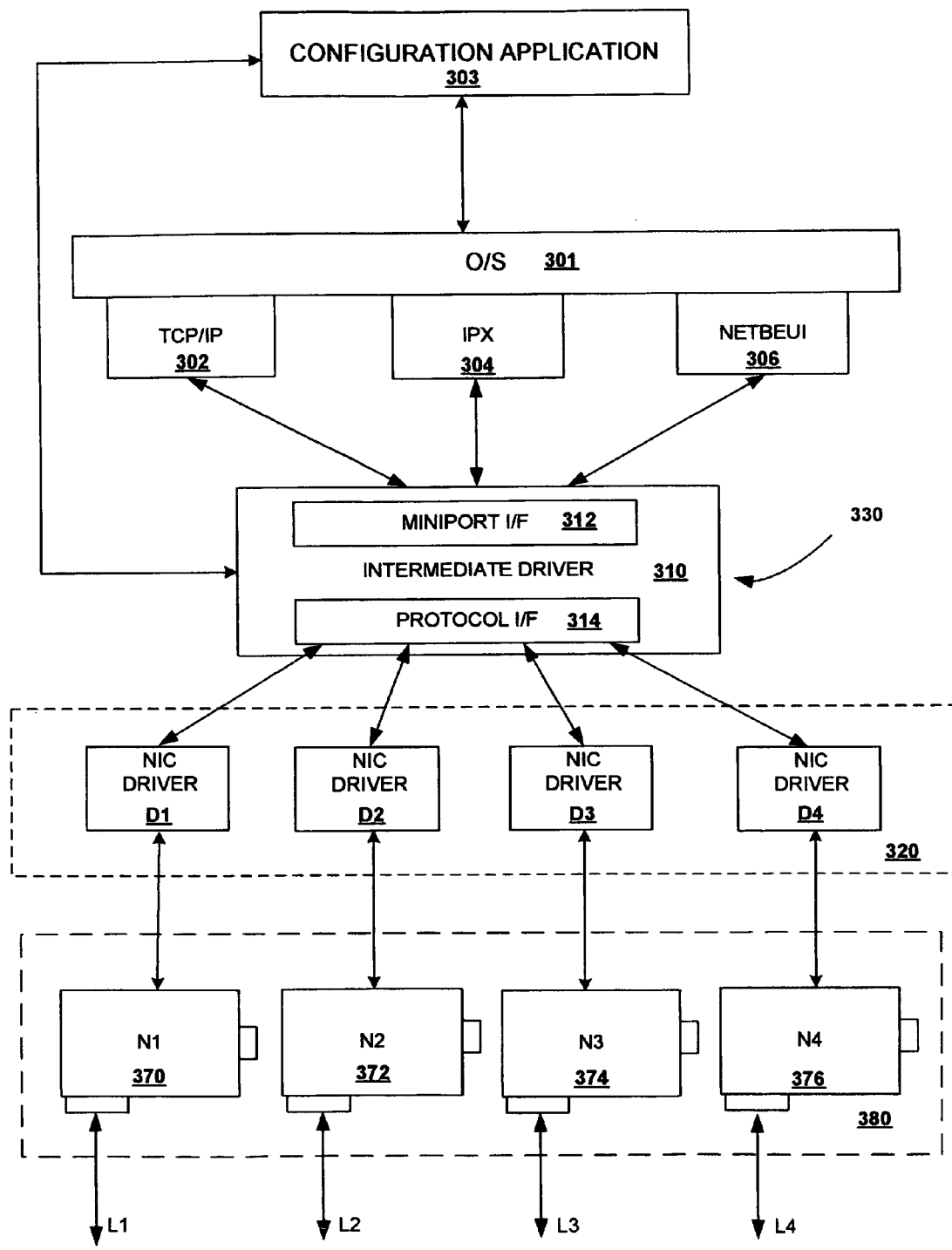
FIG. 3 is a block diagram illustrating some of the components of a controller system installed on the computer system of FIG. 1 and that may be implemented to enable teaming of network resources in accordance with an embodiment of the invention.

A more detailed discussion regarding a teaming mechanism that may be used to implement an embodiment of the invention is now presented with reference to FIG. 3. As previously mentioned, for a team of network adapter ports to operate as a single virtual adapter, all devices on the network must communicate with the team using only one layer-2 address and one layer-3 address. Put another way, a network device must see only one layer-2 (e.g. MAC) address and one protocol address (e.g. IP, IPX) for a team, regardless of the number of adapter ports that make up the team. For the IP protocol address of an Ethernet network, this means that a team will have only one entry in its ARP table (i.e. one MAC address and one IP address) for the entire team.

The computer system 100 of FIG. 3 is configured with four NICs N1-N4 and instantiations of their drivers D1, D2, D3 and D4 for purposes of illustration. Each instantiation of a driver D1 through D4 is the driver necessary to control each of the single-port NICs N1-N4. Drivers D1-D4 may be instances of the same driver if N1-N4 are the same NIC, or they may be different drivers if any of the NICs N1-N4 with which they are associated are different.

The computer system 100 has installed within it an appropriate operating system (O/S) 301 that supports networking, such as Microsoft NT, Novell Netware, Windows 2000, or any other suitable network operating system. The O/S 301 includes, supports or is otherwise loaded with the appropriate software and code to support one or more communication protocols, such as TCP/IP 302, IPX (Internet Protocol exchange) 304, NetBEUI (NETwork BIOS End User Interface) 306, etc. A configuration application 303 program runs in conjunction with O/S 301.

An embodiment of configuration application 303 provides a graphical user interface (GUI) through which users may program configuration information regarding the initial teaming of the NICs. Additionally, the configuration application 303 receives current configuration information from the teaming driver 310 that can be displayed to the user using the first GUI on display 112, including the status of the resources for its team (e.g. "failed," "standby" and/or "active"). Techniques for displaying teaming configurations and resource status are disclosed in detail in U.S. Pat. No. 6,229,538 entitled "Port-Centric Graphic Representations of Network Controllers," which is incorporated herein in its entirety by this reference. Application 303 provides commands by which the resources can be allocated to teams and reconfigured. A user can interact with the configuration program 303 through the GUIs via one or more input devices, such as the mouse 114 and the keyboard 116 and one or more output devices, such as the display 112.

A hierarchy of layers within the O/S 301, each performing a distinct function and passing information between one another, enables communication with an operating system of another network device over the network. For example, four such layers have been added to Windows 2000: the Miniport I/F Layer 312, the Protocol I/F Layer 314, the Intermediate Driver Layer 310 and the Network Driver Interface Specification (NDIS) (not shown). The Protocol I/F Layer 314 is responsible for protocol addresses and for translating protocol addresses to MAC addresses. It also provides an interface between the protocol stacks 302, 304 and 306 and the NDIS layer. The drivers for controlling each of the network adapter or NIC ports reside at the Miniport I/F Layer 312 and are typically written and provided by the vendor of the network adapter hardware. The NDIS layer is provided by Microsoft, along with its O/S, to handle communications between the Miniport Driver Layer 312 and the Protocol I/F Layer 314.

To accomplish teaming of a plurality of network adapters, an instance of an intermediate driver residing at the Intermediate Driver Layer 310 is interposed between the Miniport Driver Layer 312 and the NDIS. The Intermediate Driver Layer 310 is not really a driver per se because it does not actually control any hardware. Rather, the intermediate driver makes the group of miniport drivers for each of the NIC ports to be teamed, function seamlessly as one driver that interfaces with the NDIS layer. Thus, the intermediate driver makes the NIC drivers of a team appear to the network as one NIC driver controlling one NIC port. For each team of NIC adapter ports, there will be a separate instance of the intermediate driver at the Intermediate Driver Layer 310, each instance being used to tie together those NIC drivers that correspond to the NIC ports belonging to that team. Prior to the introduction of teaming and the intermediate driver layer 310, a protocol address typically was assigned to each individual network adapter (or NIC) driver at the Miniport Driver Layer 312. In the case of teaming, however, at least one protocol address is assigned to each instance of the intermediate driver and therefore each team.

The intermediate driver 310 presents an interface to the protocols 302-306 that appears be a single NIC driver. Also, the intermediate driver 310 appears as a single protocol interface to each of the NIC drivers D1-D4 and the corresponding NICs N1-N4. The NIC drivers D1-D4 (and the NICs N1-N4) are bound as a single team 320 as shown in FIG. 3. Because each instance of the intermediate driver can be used to combine two or more NIC drivers into a team, a user may configure multiple teams of any combination of the ports of those NICs currently installed on the computer system 100. By binding together two or more drivers corresponding to two or more ports of physical NICs, data can be transmitted and received through one of the two or more ports (in the case of an NFT team) or transmitted through all of the two or more ports and received through one for a TLB team), with the protocol stacks interacting with what appears to be only one logical device.

As previously discussed a fault tolerant team is typically employed where the throughput of a single NIC port is sufficient but fault tolerance is important. As an example, the NIC ports providing redundant links L1 through L4 to network 200 of FIG. 2 could be configured as a network fault tolerance (NFT) team. For an NFT team, one of the links (e.g. link L1 provided by a first port of the corresponding NIC N1 370 in FIG. 3) is initially assigned as the primary and is also designated "active." This assignment can be accomplished by default (e.g. the teaming driver 310 simply chooses the team member located in the lowest numbered slot as the primary member) or manually through the GUI and configuration application 303. In the example of FIG. 3, the second through fourth links of the team (e.g. L2-L4 provided by the ports P2-P4 by NICs N2 and N3) are designated as "secondary" and placed in a "standby" mode.

The primary member transmits and receives all packets on behalf of the team. If the active link (i.e. L1) fails or is disabled for any reason, the computer system 100 can detect this failure and switch to one of the secondary links by rendering it the active (and primary) link of the team while placing the failed link L1 in failed mode until it is repaired. This process is sometimes referred to as "failover." Communication between computer system 100 and devices 201-209, 250 in FIG. 2 is thereby maintained without any significant interruption. Those of skill in the art will recognize that an embodiment of an NFT team can have any number of redundant links in an NFT team, and that one link of the team will be active and all of the others will be in standby.

Figure 4A:
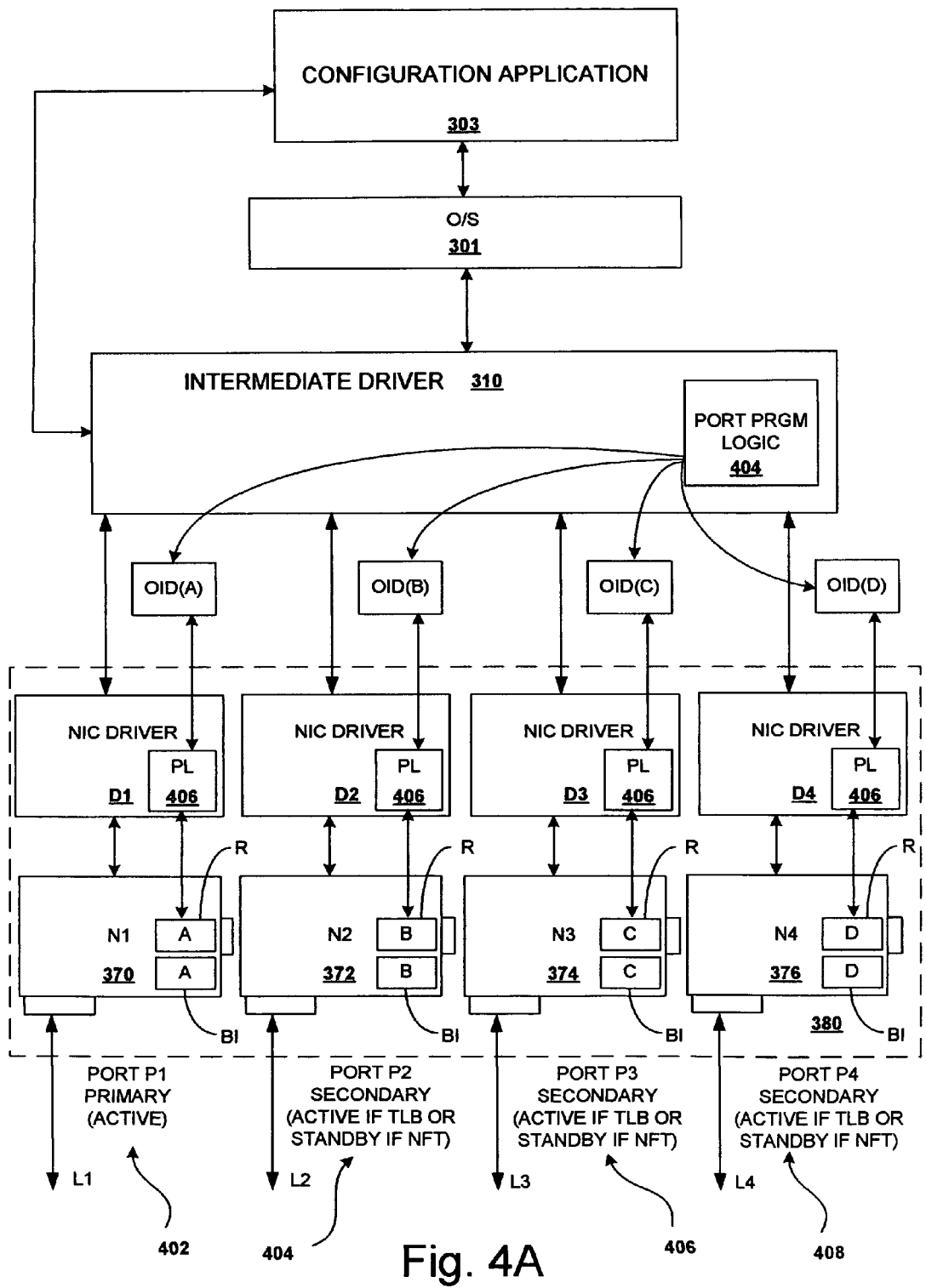
FIG. 4A is a block diagram illustrating network resources of the computer system of FIG. 1 configured as a NFT or TLB team in accordance with an embodiment of the invention.

FIG. 4A is a block diagram illustrating an embodiment of system 100 with a team of four single-port NICs that reflects the assignment of the teamed resources as a network fault tolerant (NFT) team or as a transmit load-balanced (TLB) team; that is one team member is designated as a primary and the other members are designated as secondary members. In both cases, the primary is operable to send and receive data. The difference between the two team types is that for a NFT team, the secondary members are in standby mode and the primary does all of the transmitting and receiving for the team, whereas for a TLB team the primary does all of the receiving and the secondary members are operable for transmitting but not receiving.

An instantiation of the intermediate driver 310 is created for the team upon commands from configuration application 303. Upon initialization, the instance of the teaming driver 310 first reads the BIA (burned-in MAC address) for each member of its team. In FIG. 4A the factory assigned MAC addresses are referred to as A, B, C and D, respectively. The teaming driver then picks one MAC address from the team's pool of BIAs and assigns that to a primary adapter or NIC port. In the example of FIG. 4A, port P1 402 is designated (by default) by the teaming driver 310 to be the primary and active port for the team and is assigned the MAC address for the team. The MAC address assigned to port P1 402 is then written to override register R and all of the remaining ports P2-P4 404, 406, 408 become secondary ports that are programmed with one of the remaining MAC addresses from the pool. For an NFT team the secondary resources are initially placed in standby mode. For a TLB team the secondary resources are placed in active mode. For an NFT team, only the primary receives data from or transmits data to the network on behalf of the computer system 100. For a TLB team, the data received from the network is always received at the primary, while data transmitted from system 100 is balanced over all of the resources. In this case, the MAC address assignments are the same as the BIAs.

The teaming driver 310 includes port program logic 404 that can command the NIC drivers D1-D4 to program the override register R of each of the NICs with the MAC address assignments from the pool. Each of the NIC drivers D1-D4 includes program logic 406 that receives a command, including the override receive address, from the port program logic 404 of the intermediate driver 310. The commands can be issued in the form of an Operation Identifier (OID) to each of the individual NIC drivers D1-D4. Standard NIC drivers are typically designed to recognize a plurality of standard OIDs that are usually sent from the upper level protocols. The override receive address OID used to program the receive address override register is not typically included as a standard OID.

Figure 4B:
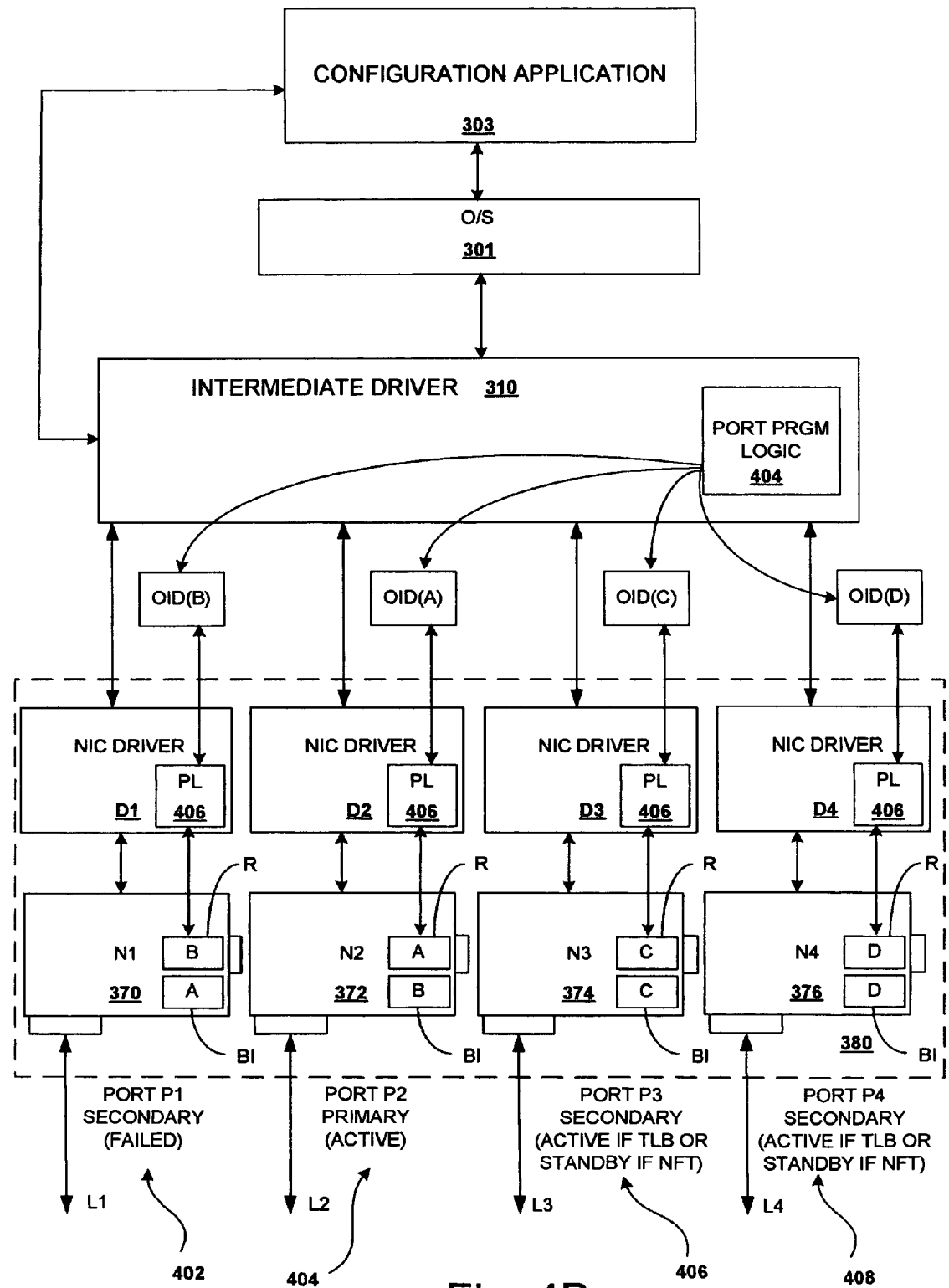
FIG. 4B is a block diagram of the NFT or TLB team of FIG. 4A after a failover condition in accordance with an embodiment of the invention.

For an NFT team, if the currently active NIC port becomes disabled or fails for any reason (e.g. loses physical with the network), a failover can be initiated whereby a secondary port becomes the active and primary port. FIG. 4B illustrates the team of FIG. 4A after a failover. The MAC addresses between ports P1 402 and P2 404 have been swapped and port P2 404 becomes active and the primary for the NFT team. The NIC 370 providing port P1 402 is placed in a "failed" mode and the failed status of the port P1 402 is communicated by the teaming driver 310 back to the configuration application 303. Likewise, the new "active" status for the NIC 372 providing port P2 404 is also sent to the configuration application 303. If the network device to which the team is coupled is a hub or a repeater, no other change is necessary. If the network device is a switch, the switch learns that the virtual device (i.e. the team) with source address A has moved from link L1 to L2, and begins sending packets with destination MAC address A to the computer system 100 via the link L2.

As previously mentioned, load balancing teams can be configured to achieve transmit load balancing or both transmit and receive load balancing. Transmit load balancing (TLB) teams are typically employed when fault tolerance is desired as well as throughput greater than that available through the single primary resource port of an NFT team. This is common for situations such as when the computer system 100 is acting as a database server and its primary role is to transmit data to numerous clients. In this example, its receive throughput requirements are significantly less than that of its transmit throughput requirements and the receive throughput requirements can be handled by the primary adapter alone.

It should be noted that for a TLB load balancing team, each active member (i.e. not failed) of the team transmits data with its own MAC address. This is not a problem for Ethernet networks employing IP as its network protocol because all source MAC addresses are stripped from packets by the receiving network devices and only the source team IP address is used to respond back to the team. For networks employing IPX as a protocol, this is not an issue because the source MAC address is embedded within the IPX protocol address. During an ARP to a team, only the team MAC address is returned to the requesting device and is stored in its ARP cache.

FIG. 5A illustrates a topology similar to that of FIG. 2, except that the team of resources has been reduced for simplicity of illustration to the two NICs NIC1 370 and NIC2 372 (and thus two NIC ports P1 812 and P2 814) shown. The two team members NIC1 370 and NIC2 372 are split between two paths to core switch 810 through redundant switches Switch A 802 and Switch B 804. The two paths are contiguous with one another through core switch 810 and form a single layer-2 broadcast domain. Each switch can service a plurality of client devices as represented by desktop PC symbols 801a and 801b respectively. The core switch 810 can also service additional network devices 801d, and virtual router 850 as shown. In the embodiment, virtual router 850 represents a plurality of redundant routers each capable of providing redundant gateway access to the Internet 852, but for which only one is active for purposes of providing the access. A more detailed discussion of the implementation of the virtual router is presented later in this specification. For purposes of the embodiments of the invention presented herein, the team comprising NIC1 370 and NIC2 372 can be either an NFT or a TLB team.

For the scenario illustrated in FIG. 5A, the network teaming intermediate driver (NTID) 310 has assigned the NIC N1 370 as the primary NIC for the team during the initial configuration of the team. Thus, all packets received by the server 100 from clients 801a, 801b coupled to switches A 802, B 804 respectively or those received from other devices coupled to the core switch 810, are received by the team's primary NIC N1 370 over link L1 at port P1 812. It follows that regardless of whether the team is a TLB or NFT team, packets transmitted to the server 100 from clients 801a coupled to switch A 802 will pass through core switch 810 and then through switch B 804 to port P1 812 as illustrated by path 820. Packets transmitted to the server by clients 801b coupled to switch B 804, and by the clients 801d and the Internet team are received through primary NIC N1 370 directly over link L1 and path 822.

If the NICs N1 370 and N2 372 are configured as an NFT team, packets transmitted to the devices on the network are transmitted through primary NIC N1 370 over link L1, through switch A 802 and over both paths 820 and 822. If the NICs N1 370 and N2 372 are configured as a TLB team, then some packets (determined by the load-balancing algorithm implemented by system 100) will also be transmitted to the devices on the network through secondary NIC N2 372 over link L2, through switch B 804 and over both paths 820 and 822. One could label path 822 the "primary" path and path 820 a "secondary" path, based on the status of the NICs to which they are coupled. Regardless of the team type (i.e. NFT or TLB), clients/devices 801a and 801b (as well as clients/devices 801d and router 826 coupled to the core switch 810) communicate with the team using the single team MAC address, which in the case of the example team of FIG. 5A is MAC address=A.

As previously discussed, a fault occurring in an uplink (806, 808) between one of the redundant switch devices (802, 804) and the core switch 810 can isolate the secondary path 820 from the primary path 822, as well as isolating one of the paths from the core network. Thus, a break in connectivity between the local area network segment due to an uplink failure such as this can result in a splitting of the once contiguous local area network or network segment that couples the computer system 100 to the core network into two noncontiguous segments. For example, in FIG. 5B the failure 854 in uplink 808 breaks connectivity between the primary path 822 and the core switch 810 and breaks the primary 822 and secondary 820 paths into two distinct local area segments. Thus, packets being transmitted by clients 801a cannot reach the primary NIC N1 370 through the core switch 810, effectively cutting off their ability to communicate with the team of server system 100. Notwithstanding that physical link between the network and NIC N2 372 may be maintained through an operable switch A 802, clients 801a, 801d and devices on the Internet 852 are no longer able to properly communicate with the server 100. Moreover, while clients 801b are still able to communicate with the server 100, neither they nor system 100 have access to the Internet 852, nor can they communicate with clients/devices 801a and 801d.

In the past the only way connectivity could be completely restored was through physical intervention by a user to repair the fault in the connection. Moreover, restoration of even partial connectivity by reconfiguring the team was performed manually. Automated schemes to recover partial or complete connectivity are desirable, but they are not easily implemented without the ability to detect which if any of the isolated segments created by the fault still provide a contiguous path to the core network. Without this information, it is difficult if not impossible for the team to make an intelligent decision about how to reconfigure itself to restore even partial connectivity to an optimal number of clients and/or functions, or to those clients or functions (e.g. Internet access) having a higher priority.

As previously mentioned, because both NICs can still have physical link with their respective paths even though a fault has isolated one or more of the paths, a conventional failover mechanism such as that previously described is not likely to be triggered. Moreover, such a simple failover procedure will not necessarily restore connectivity between the team and the core network or the Internet, and indeed may actually result in less optimal connectivity. Thus it would be advantageous to implement more complex recovery mechanisms that are triggered notwithstanding that all of the NICs of the team still have physical link with the network. Moreover, it would be desirable to intelligently reconfigure the team in view of the location of the break in connectivity to either completely bypass the fault or at least restore connectivity for an optimal configuration of clients and functions based on some predetermined priority. To implement such recovery mechanisms, however, the teaming driver must first be able sense the break in connectivity between the local area network segment and the core network and to then ascertain which paths of the once contiguous local area network have become isolated from the core network and from the team itself.

One approach to determining the new topology of the formerly contiguous segment resulting from the fault is to actively transmit special packets (such as an ARP packet) to a device in the network residing in or near the core network. The target device can then respond with a response packet that, when received by all of the members of the team, indicates that all of the paths to which they are coupled are still connected to the target device. Because the location of this echo node device is in or near the core network, if one or more members of the team fail to receive the echo packets back from the node, the teaming driver 310 can infer that the paths to which those members are coupled have become isolated from the core network by some fault that breaches connectivity between the path and the core network. From this information, the teaming driver is able to make determinations as to how best to reconfigure the team to achieve or maintain optimal connectivity between the server and the core network. Embodiments of this technique are disclosed in U.S. patent application Ser. No. 10/898,399 entitled "Method and System for Monitoring Network Connectivity," filed on Jul. 23, 2004 and which is incorporated herein in its entirety by this reference.

Embodiments of the present invention implement another approach to assessing the new topology of a local area network that has been split into noncontiguous segments due to a fault in the network breaking connectivity between those segments and the core network. This approach configures the teaming driver to passively monitor packets received by its team members that are commonly transmitted (typically as multicast frames) between devices in the network to, for example, implement a network management scheme. Various network management schemes have been developed that depend upon, for their implementation, the periodic multicasting of messages between devices embodied within the network such as switches and routers in accordance with some standardized protocol.

One example of such a network management protocol is known as Spanning Tree data that is specified under the ANSI/IEEE Std 802.1D, the entirety of which is incorporated herein by this reference. Spanning Tree defines a communication protocol involving the transmission of periodic configuration messages, the packets for which are transmitted between switches residing within a contiguous network segment or subnet. The purpose of the protocol is to manage the traffic flow through very complex networks over switches, routers and bridges that provide interconnection of various network segments and subnets. Spanning Tree endeavors to coordinate packet traffic through paths representing the least cost in terms of greatest bandwidth.

As part of this management process, Spanning Tree designates one of the switch devices of a contiguous broadcast domain as the "root" switch of the domain. The root switch is typically near or within the core network and multicasts cost packets to the other Spanning Tree managed devices. Because each domain has only one root switch, as long as Spanning Tree data packets are received by the teaming driver 310 through its team members from that single root switch as expected, the teaming driver can assume that the paths comprising the segment to which the team is coupled remain contiguous and presumably coupled together through the core network. If the teaming driver senses that one of the team members has ceased to receive the expected Spanning Tree packets altogether, it can be assumed that the team member has become isolated from the root device and the other devices being managed by Spanning Tree. Likewise, if the teaming driver senses that its team members are receiving packets from more than one root switch (i.e. one or more team members are receiving configuration messages but not receiving the expected Spanning Tree messages), the teaming driver can interpret this as indicating that not all of the paths of the original segment are still contiguous and part of the same broadcast domain. This interpretation derives from the fact that to have a second root device, a Spanning Tree device has become isolated from the original root switch due to a fault in the network and has been elected as the root switch for the segment and broadcast domain newly created by the fault.

To distinguish between configuration messages from different root switches, the teaming driver 310 can maintain a history or context of received messages for each team member and compare them. Certain data fields within the message packets will identify them as coming from a particular device acting as a root device. When all members are receiving messages from only one root switch as expected, the contexts for the members will be the same. When a break in connectivity occurs between a path of the local area network segment and the core network results in the creation of a new root for the path that through its isolation has become a new segment, the contexts for the team member(s) coupled to that segment will differ from those received by the team member(s) still having connectivity to the core. The teaming driver can be configured to recognize this condition as indicating a fault after not receiving expected configuration messages for some predetermined period of time.

Another network management technique that communicates network management packets that may be used to detect faults and their location on the network involves the implementation of the virtual router 850 of FIG. 5A. Virtual router techniques have been developed to avoid problems associated with statically configuring routes over which an end host (such as server 100) may reach a particular IP destination outside of the local area network (e.g. on the Internet 852). In a static configuration, the hosts in a network will be configured to use a specific IP address as the gateway or default route. This gateway must be reachable by all hosts in a network wishing to communicate with any device outside of the local area network, such as over the Internet 852. Statically establishing the route avoids known issues related to dynamically determining the route, but introduces a single point of failure if the router used as the gateway fails for any reason.

To eliminate this single point of failure in the network, a virtual router is implemented consisting of two or more physical routers teamed to provide redundant routes to the remote destination in the event one of the routers fails. One of the physical routers of the team is designated as the primary (also sometimes referred to as the master) router for the team and actively performs the routing function for the virtual router. As long as the primary router is operational, it will respond to all traffic destined for the IP and MAC addresses assigned to the virtual router. The other member(s) of the virtual router team is (are) designated as secondary (also sometimes referred to as slaves), and while active to provide routing functions for other packets in the network, is (are) programmed to ignore packets addresses to the virtual router so long as they are not designated the primary for the team. If the primary router fails, one of the secondary routers currently in standby mode with respect to packets destined for the virtual router is dynamically designated to pick up the forwarding duties of the virtual router, thus providing for "router failover." If more than one secondary for the virtual router team exists when a failure of the primary occurs, the new primary is elected from the available secondaries based on a standardized protocol used to implement the virtual router scheme.

Configuration and management of the virtual router team is accomplished through the use of periodic virtual router advertisement messages that are multicast over the network between the team members of the virtual router. A number of protocols have been established to implement a virtual router. VRRP (virtual Router Redundancy Protocol) is a protocol proposed as a standard by the Internet Engineering Task Force (IETF). The current draft specification for VRRP is available from the IETF web site at www.ietf.org and which is incorporated herein in its entirety by this reference. XRRP (Hewlett-Packard XL Router Redundancy Protocol) is a proprietary router protocol developed by the Hewlett-Packard Corporation. HSRP (Hot-Standby Router Protocol) is a proprietary implementation of a virtual router protocol developed by Cisco Systems, Inc. and is a precursor of VRRP. Other than a few implementation details, these protocols are quite similar in their operation. For example, VRRP and XRRP messages are periodically transmitted by the primary to indicate to the secondary(ies) that the master is still operating properly. In the case of HSRP, a router designated as a secondary for the team will also broadcast advertisement packets to indicate to all members of the virtual router team that it is still operational.

The frequency at which these advertisement messages are multicast is known as the advertisement interval and the default is typically one second. The advertisement interval can be changed, and its current value is reflected in a field of the advertisement message frame itself. Typically, the gateway virtual router (and thus all of the physical routers that comprise it) lies within the core network. In an embodiment, if a fault occurs that breaks connectivity with a member of a NIC team, the team member will either cease to receive the expected advertisement messages altogether (e.g. if isolated from all members of the virtual router), or it will begin receiving messages from a different one of the routers that has itself become isolated from the virtual router team and has been elected as a primary due to its isolation from the original primary. As in the case of the Spanning Tree embodiment described above, the teaming driver can maintain contexts for each of the team members and compare them for purposes of distinguishing between expected advertisement messages received from a single virtual router device and those received from two devices comprising the same virtual router or those from different virtual routers.

Figure 6:
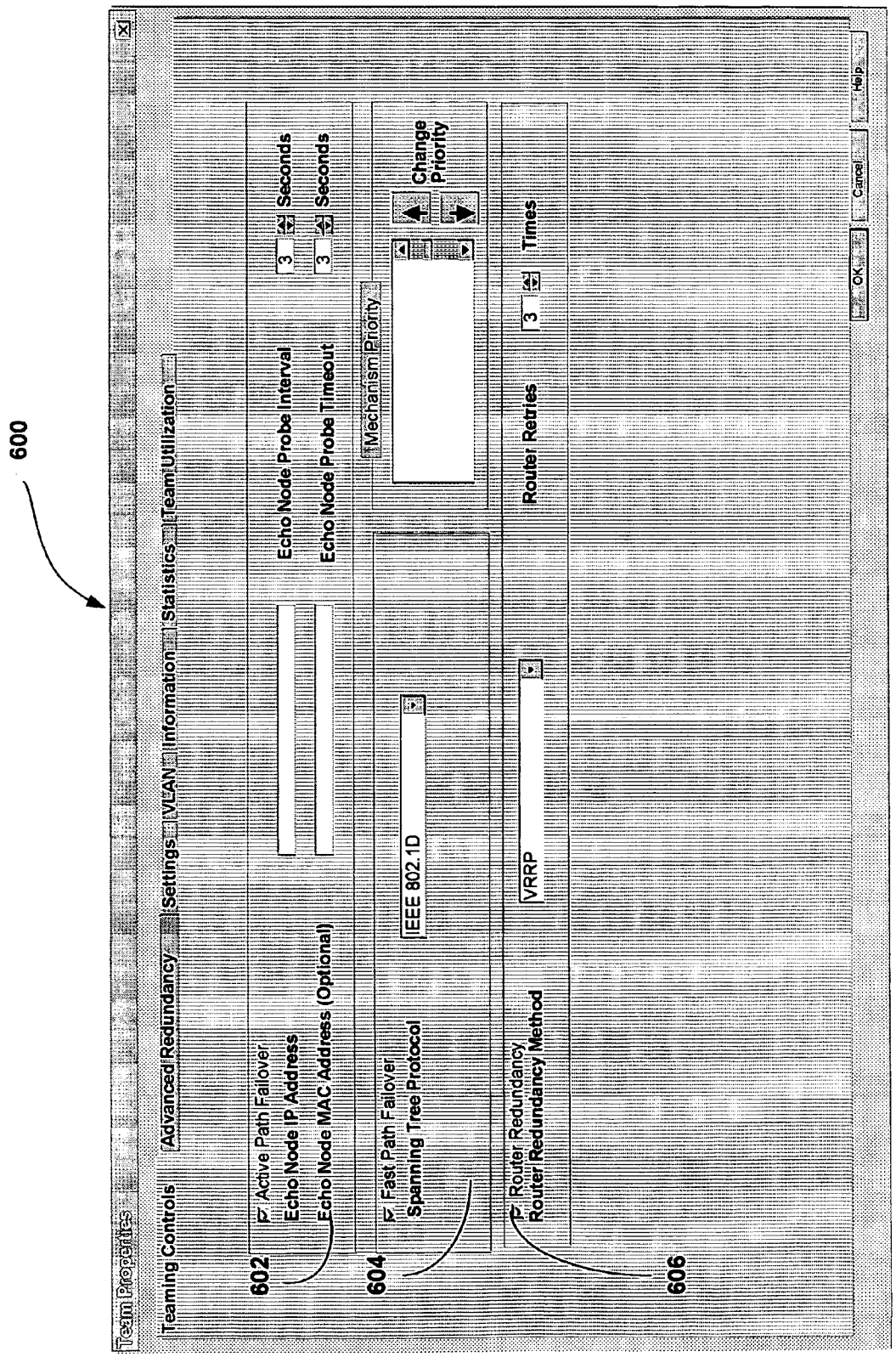

FIG. 6 illustrates an embodiment of an input interface 600 of the GUI by which configuration inputs may be entered to the configuration application 303 to configure the teaming driver 310 to enable one or more of the foregoing techniques for detecting faults in the network. Inputs 602 can be used to enable active echo node detection. Inputs 604 can be used to enable the passive monitoring of Spanning Tree packets. Inputs 606 can be used to enable and configure the passive monitoring of virtual router advertisement packets implementing router redundancy. Inputs 606 permit the user to specify the source IP address for the packets (which is the IP address statically specified for reaching the default gateway router and to distinguish advertisement messages that may be received from other virtual routers in the network), as well as a maximum permissible time period (i.e. timeout) between received advertisement frames that when exceeded indicates that a team member has become isolated from the core network. In an embodiment, the timeout is specified as three times the advertisement interval. This is the same timeout typically employed by the routers comprising the virtual router to determine a failure of a member of the router team for failure to advertise.

Depending upon the monitoring technique enabled, the teaming driver 310 configures its members in a manner necessary to recognize and specially process the type of packets to be monitored, and caches context information for each of its team members from the packets as they are received. Any NIC in an NFT or TLB team that doesn't receive the expected packets within a programmed timeout period is considered isolated from the core network and this can serve as a trigger to reconfigure the team through some automated or manual recovery mechanism.

In an embodiment configured to monitor router redundancy advertisement frames, the configuration program 303 instructs the network teaming intermediate driver 310 to configure all of the NICs of its team to receive (i.e. listen for) frames that carry the HSRP/VRRP/XRRP advertisement information (it should be noted that other techniques for configuring the teaming driver may be employed without exceeding the intended scope of the invention). The parameters by which these frames are recognized and processed can be specified by the inputs 606 of the GUI as previously described. The advertisement frames all use a defined multicast MAC address as the destination MAC address in the layer-2 frame header. The defined multicast MAC address varies, depending on the selected protocol type to be monitored. For example, VRRP enabled routers broadcast to an IP address of 224.0.0.18 and the corresponding MAC address 01:00:5E:00:00:12. HSRP enabled routers communicate by sending to an IP address of 224.0.0.2 and the corresponding MAC address 01:00:5E:00:00:02. The teaming driver 310 stores the appropriate destination addresses in each team member's multicast address list, and listens for advertisement packets that include the source address specified for the router as provided through inputs 606.

If teaming driver 310 is not able to program the members of its team to receive using these multicast addresses (for instance, if all of the supported multicast addresses are currently in use), an event is logged and the HSRP/VRRP/XRRP feature is disabled. When the router redundancy monitoring feature is disabled, the multicast address for receiving the advertisement frames must be removed from the multicast address lists of each team member if the only reason it was added to the list was because the teaming driver 310 registered it for monitoring purposes. If the teaming driver 310 did not register it then it should be left intact as it was added for some other purpose, such as by the protocol stack (for instance).

Once programmed, the team members listen to only those advertisement messages multicast by the statically configured default gateway virtual router. Received packets from each team member are analyzed to determine whether they are advertised HSRP/VRRP/XRRP frames. If not, they are handled normally. If a received packet is a HSRP/VRRP/XRRP advertisement, four components of the frame are saved in the team member's context. The first is the Virtual Router ID (for VRRP), Group ID (for HSRP) or Domain/Router ID (for XRRP). The second is the Priority assigned to the transmitting router for all three protocols. The third is the source MAC address. For VRRP the Virtual Source MAC address is in the format—00:00:5E:00:01:XX, where XX is the virtual router ID in hex notation. For HSRP, the Virtual Source MAC address will be in the format—00:00:0C:07:AC:XX where XX is the virtual router ID in hex notation. For XRRP, the Virtual Source MAC address will be in the format—XXXX-XXXX-XXXX-XXXX-XDDR where D represents the domain number (4 bits) and R is the router number (2 bits). The fourth is the source IP address of the monitored frame.

It should be noted that teaming driver 310 can be similarly configured, based on inputs 604 of the GUI to the configuration program 303, to recognize and process path cost packets communicated in the implementation of the Spanning Tree network management protocol. Those of skill in the art will recognize that the team members can be programmed to recognize and accept the Spanning Tree packets based on criteria similar to those used to identify the virtual router advertisement frames as previously discussed. Moreover, those of skill in the art will recognize that the present invention should not be limited to Spanning Tree configuration messages or router redundancy advertisement messages, but can be employed based on any type of communication having the general characteristics of the foregoing embodiments.

In an embodiment, the teaming driver 310 (as configured by the configuration program 303) is operable to detect a split segment condition such as the one illustrated in FIG. 5B by passively monitoring virtual router advertisement frames multicast by the virtual router represented by router 850. In the case of FIG. 5B, the fault 854 causes a break in connectivity that isolates NIC N1 370 from the core network as well as the virtual gateway router 850 providing access to the Internet 852. Because NIC N1 370 is currently designated as the primary for the team of network resources of server 100, the fault 854 leads to an interruption in communication between server 100 and all network devices but clients 801b.

Figure 5C:
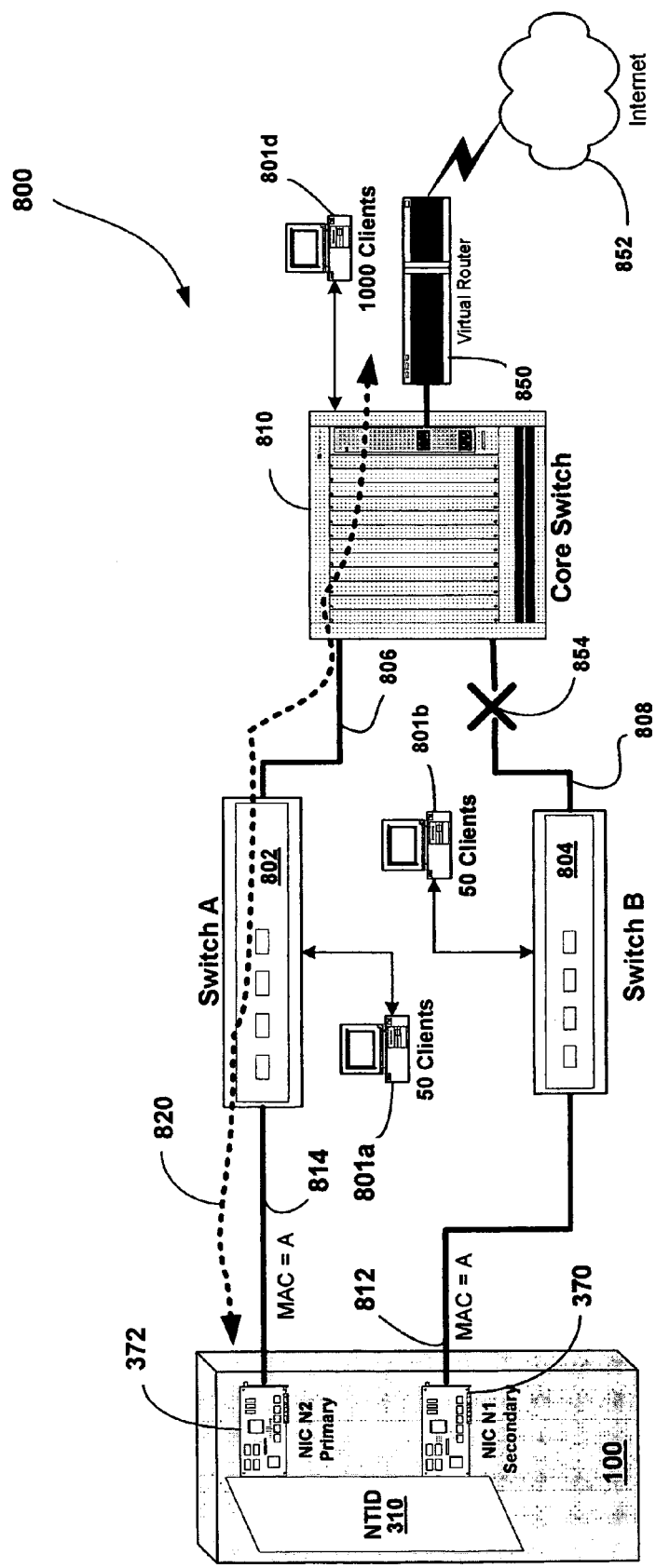
FIG. 5C is the network diagram of FIGS. 5A and 5B illustrating the computer system operating after a failover that results in partial recovery of connectivity in accordance with an embodiment of the invention.

The teaming driver 310 is able to infer that a break in the connectivity between the primary path 822 and the core network has isolated it from the secondary path 820 based on the fact NIC N1 370 is no longer able to receive the router protocol packets due to the fault. The teaming driver 310 is also aware that the secondary path does still have connectivity with the core network because it is still receiving the router protocol packets comprising the advertisement messages. Based on this knowledge of the split LAN condition, the teaming driver 310 is able to initiate a recovery process that at a minimum can recover connectivity between the server 100 and the core network. In an embodiment of a recovery process, the teaming driver 310 can accomplish this based on the general rule that if the current primary (e.g. NIC N1 370) has been isolated from the core network and thus the virtual router 850, the teaming driver should always designate a team member as the primary that is coupled to a path still having communication with the core network and the primary of the virtual gateway router 850. Of course, the NICs could be further ranked in priority in the event that two or more NICs of the team still have connectivity with the core and the router 850. The NICs could be ranked based on such factors as the number of clients served by their respective paths, the lowest cost path to the router 850, etc. The decision as to which NIC should be made the primary could then be made by the teaming driver 310 based on this ranking. FIG. 5C illustrates implementation of this policy in connection with the fault condition illustrated in FIG. 5B, reconfiguring the team by designating the NIC N2 372 as the new primary for the network team.

If the team is an NFT team, no further reconfiguration may be necessary, as only the primary NIC is active (except to receive router protocol packets) for transmitting and receiving for an NFT team. If the team was originally configured as a TLB team (i.e. both NICs were active for load-balancing transmitted packets), then NIC N1 370 should be placed in standby mode. The fact that it is isolated from the core network precludes it from being properly used for load balancing transmitted packets; any packets that it might transmit that are destined for the core network will not reach it. As can be seen from FIG. 5C, connectivity between the team and clients 801a has been reestablished by way of the return path 820 provided through NIC N2 372 acting as the team primary. In addition, communication has been reestablished between the team (and therefore with server 100) with the Internet 852 through virtual router 850. The only devices on the network that now lack communication with the server 100 are clients 801*b*. The teaming driver 310 can then monitor for and detect restoration of the uplink (e.g. when NIC N1 370 is again able to receive expected advertisement messages from virtual router 850) and in response thereto can return the team back to its original operating mode if appropriate.

Figure 5D:
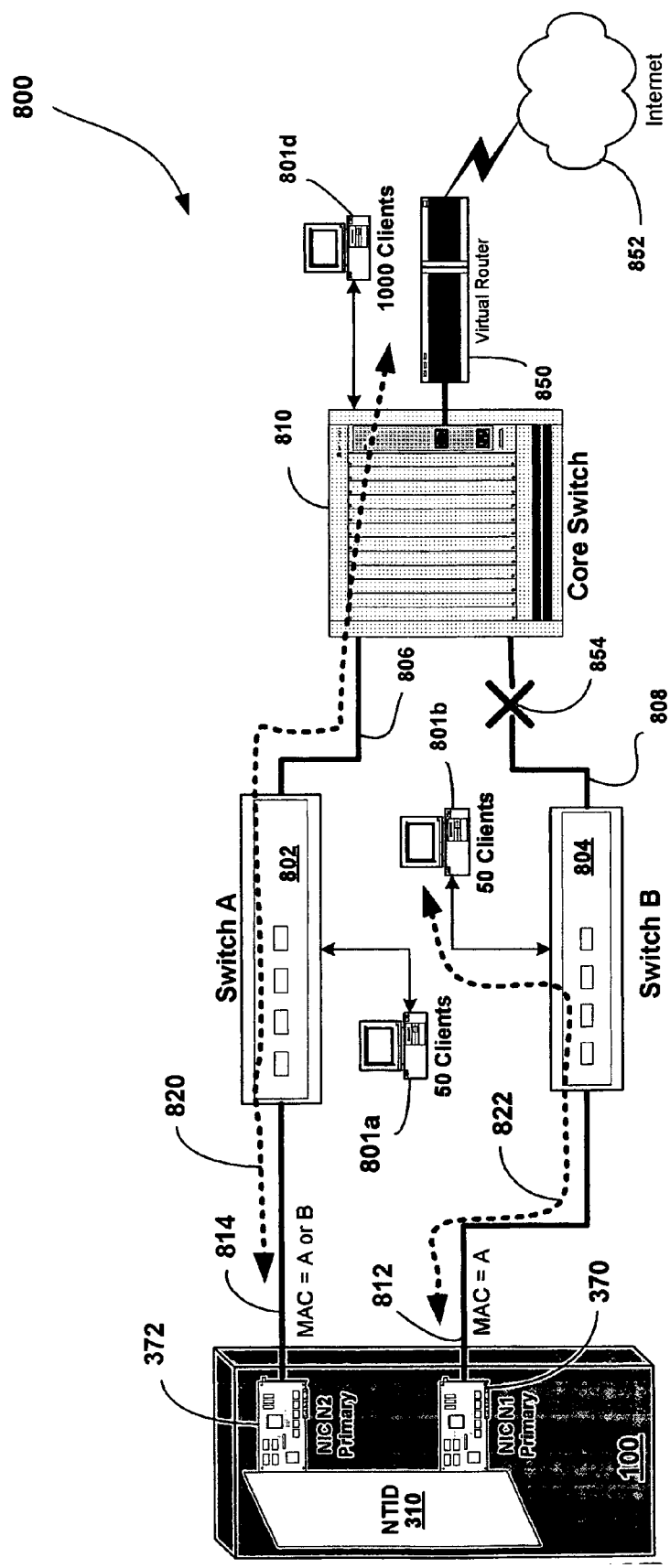
FIG. 5D is the network diagram of FIGS. 5A, 5B and 5C illustrating the computer system operating after a failover that results in full recovery of connectivity in accordance with an embodiment of the invention.

FIG. 5D illustrates the result of a more complex recovery solution that designates one NIC team member coupled to each isolated segment as a primary in response to the detection of the fault 854 by teaming driver 310 as previously described. Doing so ensures that a receive path back to the server is established for each of the split LAN segments, in addition to the original primary path. Connectivity between the computer system 100, the core network and the Internet 852 can thereby be restored to all clients until the link failure can be repaired. This recovery process is a bit more complex because the team is now split into what amounts to multiple teams each with its own primary until the fault has been fixed. The complexity in this process is in returning the team to its original configuration upon detection that the fault is eliminated. A more detailed description of an embodiment of this split-LAN recovery process is described in more detail below with reference to the procedural flow diagram of FIG. 8.

Figure 7A:
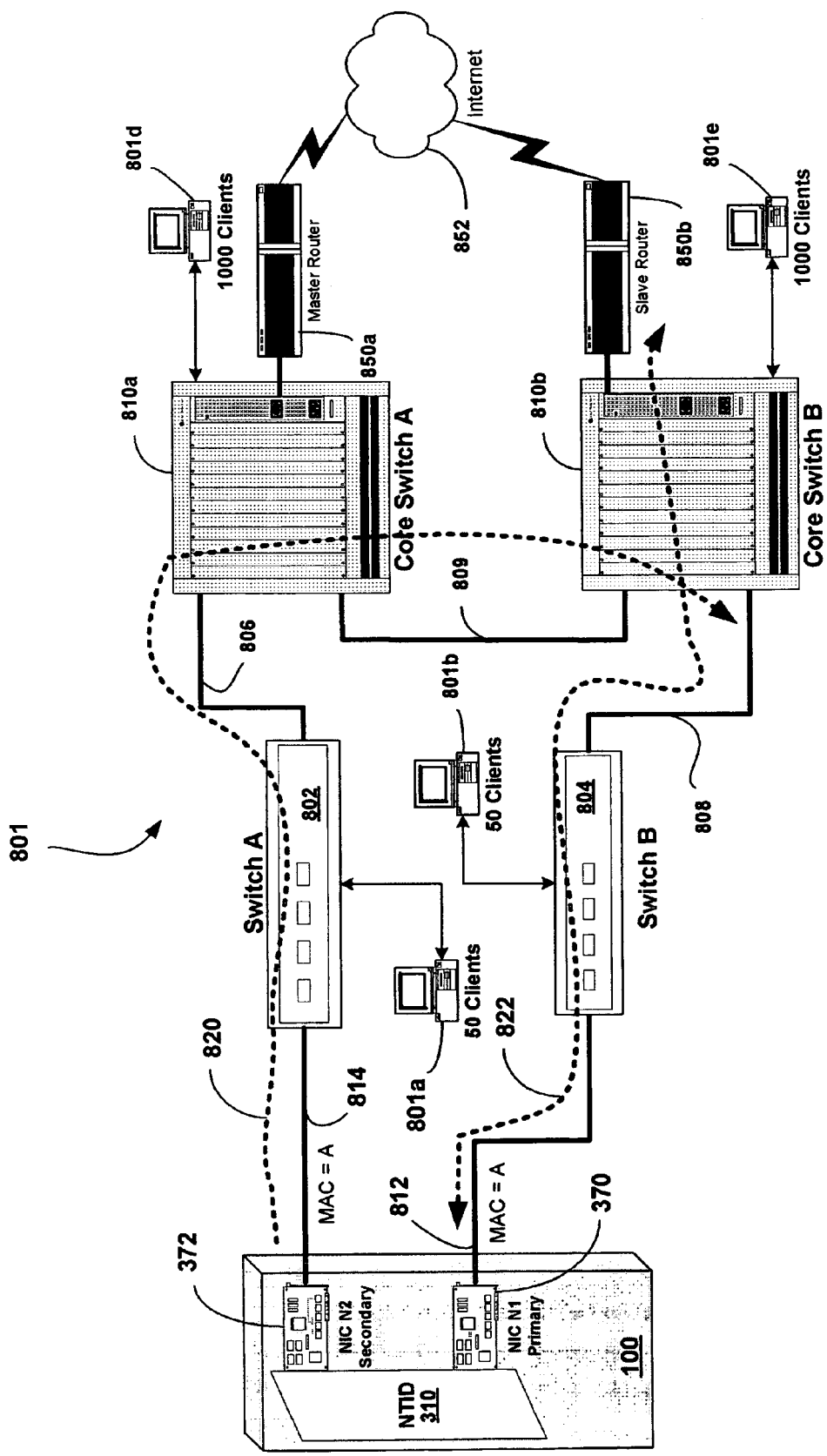
FIG. 7A is a network diagram illustrating a more complex local area network segment topology to which a computer system is coupled that features an embodiment of the invention.
Figure 7B:
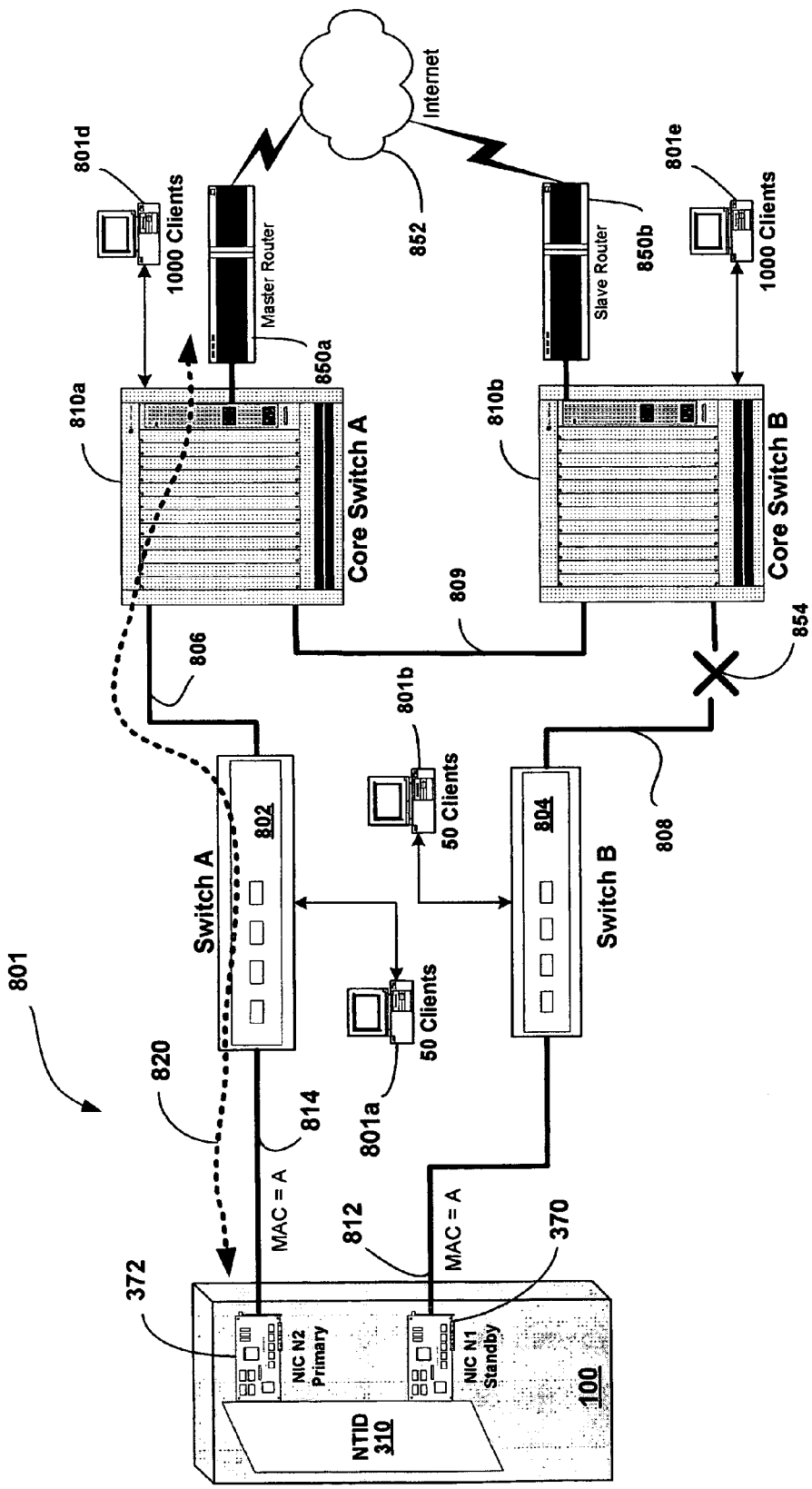
FIG. 7B is a network diagram illustrating the more complex local area network segment topology of FIG. 7A having an uplink failure to which a computer system is coupled that features an embodiment of the invention.

FIG. 7A illustrates another topology that might be encountered where each path of the contiguous local area network segment is coupled to the core network through its own core switch. The two core switches 810*a* and 810*b* are linked together through switch link 809. In this case, each core switch is coupled to one of the routers (850*a* and 850*b* respectively) that together form the virtual router 850. So long as no faults occur, the teaming driver 310 senses that both NICs of the team are receiving the expected virtual router advertisement message packets from the master router 850*a*. In the case of a fault in uplink 808, NIC N1 370 will fail to receive the advertisement packets and FIG. 7B illustrates how the teaming driver 310 can reconfigure the team to recover in the manner previously discussed with reference to the example of FIG. 5C.

Figure 7C:
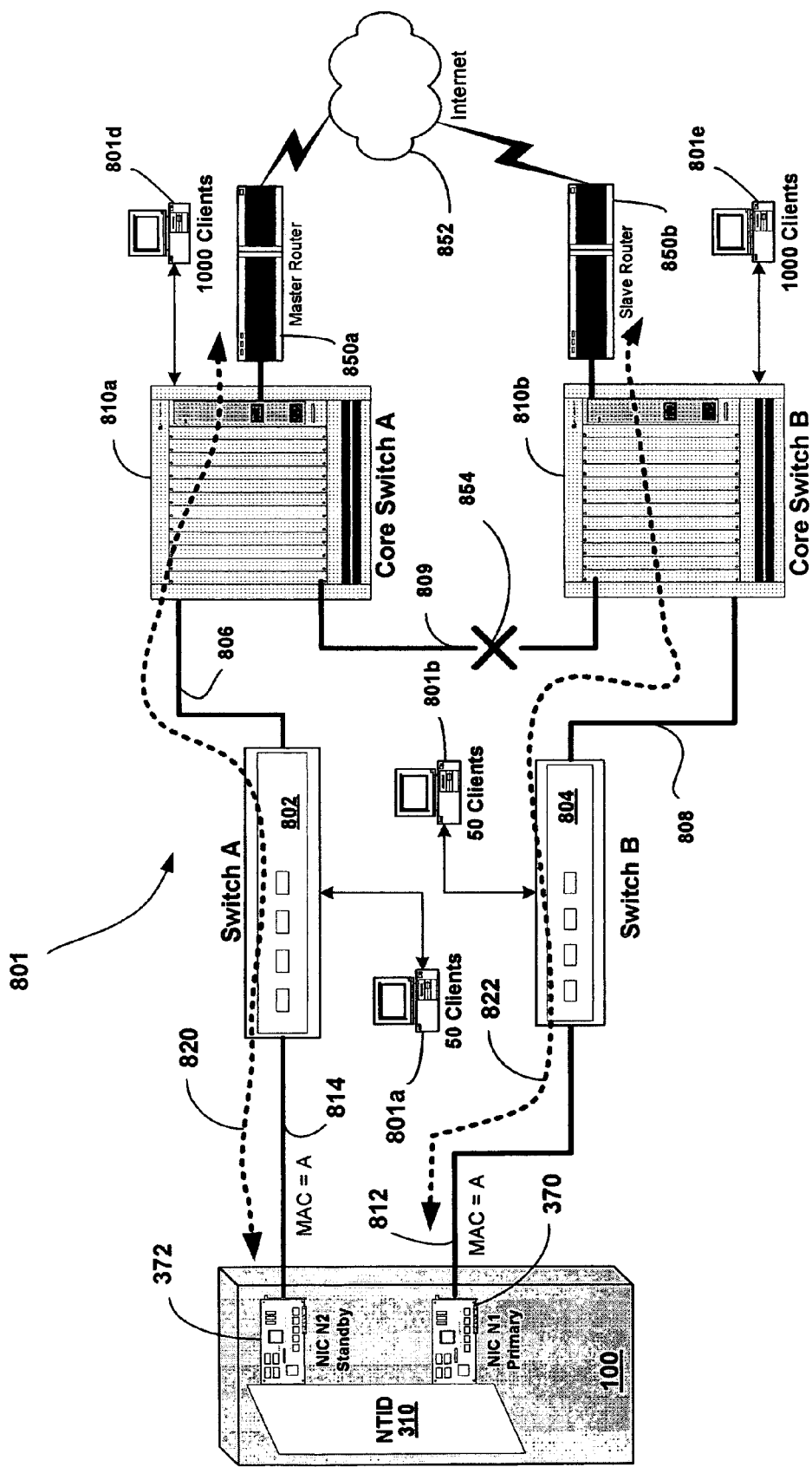
FIG. 7C is a network diagram illustrating the more complex local area network segment of FIGS. 7A and 7B having a switch cross-link failure to which a computer system is coupled that features an embodiment of the invention.

FIG. 7C illustrates a fault 854 occurring in cross-couple link 809. In this case, not only does the fault isolate the two paths 820 and 822 from one another, but it also isolates the two routers that form the virtual router 850. When this occurs, the secondary 850*b* fails to receive the advertisement message packets from the master 850*a* and assumes the role as a primary for the now isolated path coupled to NIC N1 370. Thus, both NICs of the server team will receive advertisement message packets, but each from a different one of the routers acting as a primary for the split members of the virtual router. In this case, the teaming driver 310 can distinguish between the expected advertisement packets received from the original primary router 850*a* and the advertisement packets received from the secondary 850*b* that has now assumed the role of primary based on, for example, the differences in priority assigned to the devices. This priority information is contained within the advertisement packets as previously discussed.

Figure 7D:
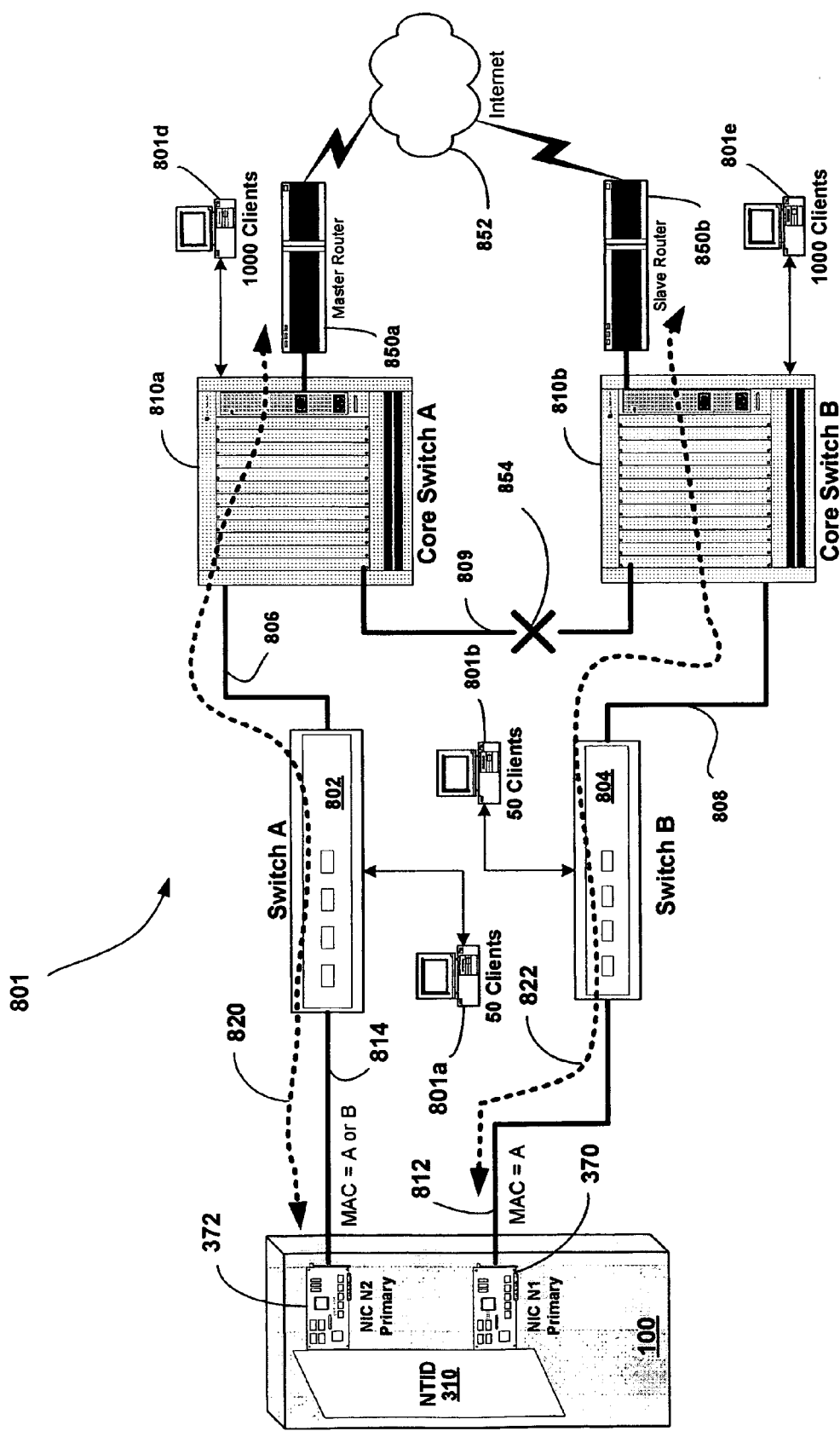
FIG. 7D is a block diagram illustrating the more complex local area network segment and switch cross-link failure of FIG. 7C after a failover that results in full recovery of connectivity in accordance with an embodiment of the invention.

Once the teaming driver detects that each NIC is receiving protocol packets from a different router (i.e. one or more of the team members are no longer receiving the expected advertisement message packets), it can initiate a recovery as described above. In the case of this topology, those of skill in the art will recognize that changing which of the NICs is designated as the primary for the team may not buy much improvement in connectivity; the server 100 maintains communication with the Internet 852 and the core network regardless of which NIC of server 100 has been designated the primary for the team. The only action that should be taken by the teaming driver 310 is to place the secondary NIC in standby if the team is a TLB team, as the secondary NIC cannot be used for load balancing if it cannot communicate with the entire network. Full communication with the network can be reestablished, however, if the recovery process involves designating the isolated secondary NIC as a primary as well. This scenario is illustrated in FIG. 7D and once again, the detailed explanation for accomplishing this recovery is described below with reference to FIG. 8.

Figure 8:
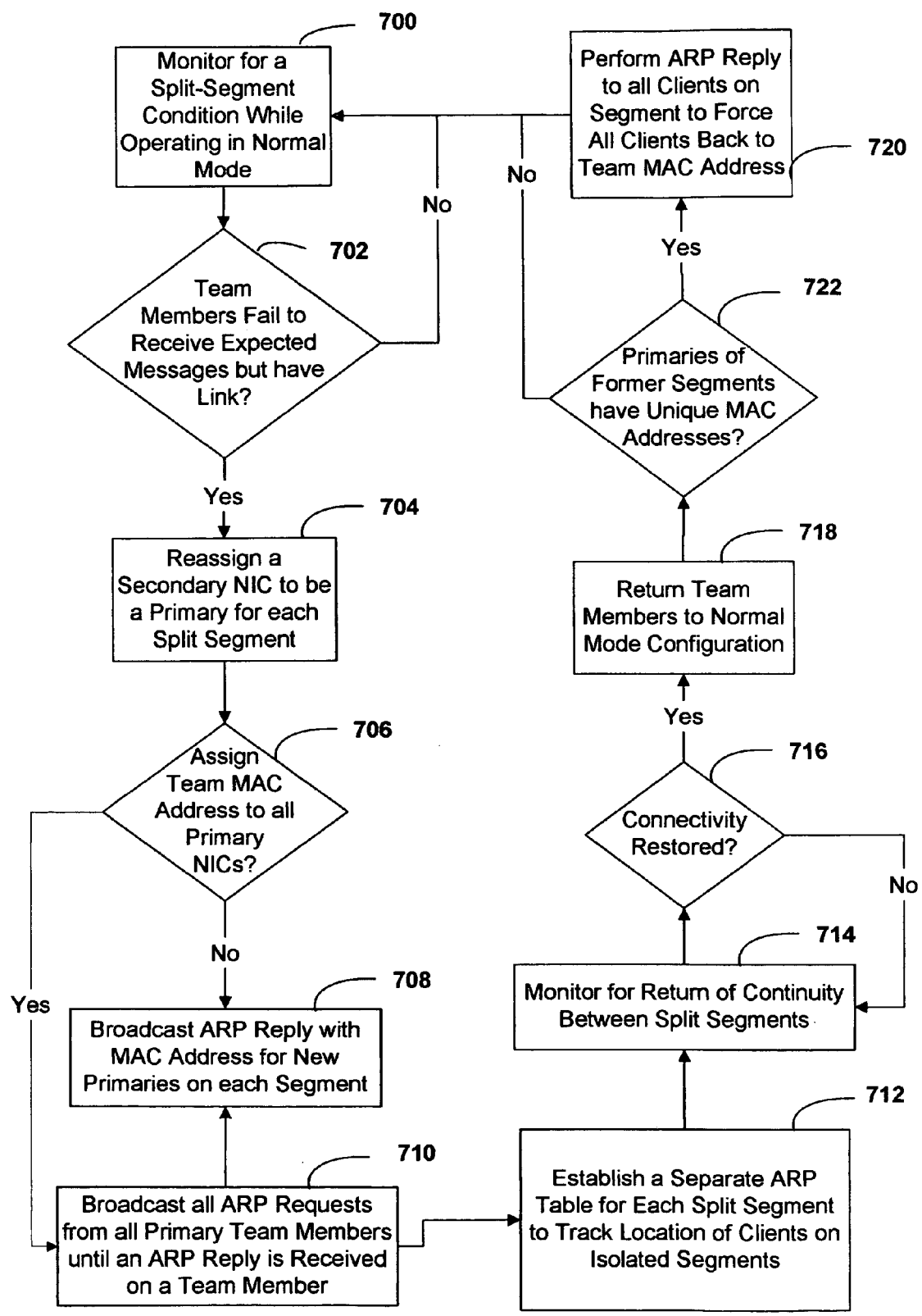
FIG. 8 is a procedural flow diagram for an embodiment of the invention.

FIG. 8 illustrates a procedural flow diagram of an embodiment of the invention that accomplishes the full recovery of network continuity in the event of a split LAN process as described above. At 700, the teaming driver has the team configured in a normal mode wherein, regardless of whether the team is a TLB or NFT team, the team has only one member designated as a primary. While in the normal mode, the teaming driver 310 of system 100 monitors operation of the team to detect when one of its team members becomes isolated in accordance with one of the techniques previously described and as configured through the GUI as illustrated in FIG. 6.

If the teaming driver detects an isolated NIC at 702 (due to a break in connectivity such as the one illustrated in FIG. 5B, 7B, or 7C), the teaming driver 310 designates the isolated NIC as a primary NIC at 704. The process by which this designation can be accomplished has been previously described in detail in the context of the teaming mechanism. If more than one NIC of the team is coupled to the isolated path, only one of the NICs is designated as a primary. The teaming driver than operates in split segment mode beginning at 704. In an embodiment of the complete split-LAN recovery procedure of FIG. 8, the teaming driver assigns the team MAC address to the newly designated primary NIC (in the example of FIG. 5D and FIG. 7D, this is MAC address=A). In normal mode, only one network device or team of devices is permitted to have the same MAC address on a local area network segment (i.e. in the same broadcast domain). In the split segment mode at 704, however, this is not a problem because the newly designated primary NIC N2 372 is now coupled to a segment isolated from the rest of the team and thus constitutes a distinct level-2 broadcast domain. Thus, in the procedural flow of FIG. 8, if the teaming driver 310 assigns the current team MAC address to each new primary, the answer at 706 is "Yes" and processing continues at 710.

In another embodiment, the teaming driver 310 can assign each newly designated primary NIC on each isolated segment a different MAC address. Thus, in FIGS. 5D and 7D, NIC N2 372 can be assigned a different MAC address=B. In this case, however, the clients/devices that were communicating with the server using the original normal mode team MAC address (MAC address=A) must now be advised to use the newly assigned MAC address B to address packets to the new primary NIC through which that particular segment will now be communicating with server 100. Thus, in the procedural flow of FIG. 8, if the teaming driver 310 assigns a different MAC address to each new primary, the answer at 706 is "No" and processing continues at 708 where an ARP reply is broadcast on each of the isolated segments. The ARP reply forces the clients/devices on each segment to update their ARP tables to reflect the new MAC address assigned to that segment as the address by which they may communicate with the computer system 100.

Once the segment is split, there is no way for the protocol stack to know which clients are on which segments. Thus in an embodiment at 710, the teaming driver 310 must initially broadcast all ARP requests over all of the isolated segments to which the team is coupled until it receives ARP replies at one of the primaries that serves to indicate to which segment a particular network device is coupled. The teaming driver 310 establishes and maintains temporary ARP tables at 712 for each isolated segment and once a reply is received at one of the primary NICs, the ARP table established for that segment is updated with the MAC address of the replying client/network device. Henceforth the teaming driver 310 knows that packets destined for that device should be transmitted through that NIC.

Processing continues at 714 where the teaming driver 310 then monitors for the return of continuity between the isolated segments. For example, the teaming driver 310 continues monitor router protocol advertisement frames until the frames having the same priority are once again received on all team members indicating that connectivity in the failed uplink has been restored. If Spanning Tree is used, the teaming driver 310 monitors Spanning Tree data until it detects that there is once again only one root switch to which the entire team is coupled. This again would indicate that the original segment has been restored. Once continuity between all paths of the original segment is detected at 716, the answer is "Yes" and processing continues at 718 where the primaries are returned to their original roles in the normal mode (i.e. only one primary member remains, such as in FIG. 6A).

Processing continues at 720 where it is determined whether the various teaming drivers have been assigned the original normal mode team MAC address or their own unique MAC address. If unique MAC addresses were assigned, the answer at 720 is "Yes" and processing continues at 722 where the teaming driver 310 issues a broadcast ARP reply that forces all devices on the segment back to the original team MAC address=A. Processing then continues at 700, where the teaming driver 310 then monitors for split segments again in accordance with the foregoing discussion. If the answer at 720 is "No", processing again resumes at 700. In an embodiment where only the original normal mode team MAC address=A is assigned to all primaries created during the split segment recovery mode, there will be a brief time after continuity of the segment is restored where more than one primary will be operating with the same MAC address within the same broadcast domain. While this can cause confusion briefly for the switches responding to multiple devices with the same MAC address, once the team has been restored to normal mode having a single primary, the system will recover and operate normally with no harm done.

What is claimed is:

1. A method comprising:
monitoring connectivity between a core network and two or more operational paths comprising a contiguous local area network segment of a local area network, each of the two or more operational paths coupling at least one member of a team of network interface resources of an end-node computer system of the local area network to the core network, said monitoring comprising:
configuring each member of the team to receive network management frames transmitted by one or more devices residing near or within the core network; and
detecting a break in the connectivity between a path of the contiguous local area network segment and the core network based on the at least one member of the team coupled to that path fails to receive an expected one of the network management frames within a predetermined time period.

2. The method of claim 1 further comprising reconfiguring the team in response to an active member of the team being coupled to the path of the local area network segment having the detected break in connectivity with the core network, wherein the detected break in connectivity splits the contiguous local area network segment into at least two noncontiguous segments, and wherein the end-node computer system comprises a server or a personal computer (PC).

3. The method of claim 2 wherein one of the members of the team is initially designated as a primary, wherein the detected break in connectivity comprises a fault in an uplink between a redundant switch and a core switch, and wherein said reconfiguring further comprises designating a different member of the team as the primary that is coupled to one of the operational paths not having the detected break in connectivity with the core network.

4. The method of claim 3 wherein said reconfiguring further comprises placing in a standby mode any secondary member that was initially active to provide load-balancing for the local area network segment and is coupled to the path having the detected break in connectivity with the core network.

5. The method of claim 2 wherein said reconfiguring further comprises designating as a primary one team member coupled to the path having the detected break in connectivity with the core network.

6. The method of claim 5 wherein said designating further comprises assigning the designated primary to communicate with a MAC address previously assigned to the team.

7. The method of claim 5 wherein said designating further comprises assigning the designated primary to communicate with a unique MAC address.

8. The method of claim 2 further comprising detecting repair of the detected break in the connectivity between the path and the core network based on resumption of receiving the expected network management frames by one of the members of the team coupled to the path.

9. The method of claim 1 wherein configuring comprises configuring, via a teaming driver, each of the members of the team to receive network management frames transmitted by one or more devices residing near or within the core network, wherein the network management frames are Spanning Tree configuration messages transmitted by a core network device elected to be the root for the local area network segment, and wherein the detected break in connectivity splits the contiguous local area network segment into at least two noncontiguous segments.

10. The method of claim 2 wherein said detecting a break in the connectivity between the path and the core network further comprises distinguishing between configuration messages received by the team members from the root device for the contiguous local area network segment and configuration messages received from another device that has established itself as the root for the path having the detected break, wherein the detected break in connectivity comprises a break in connectivity between a switch of the path with a core switch of the core network, and wherein the detected break in connectivity isolates one of the two or more operational paths from the core network.

11. The method of claim 1 wherein the expected network management frames are virtual router advertisement messages transmitted by a virtual router residing in the core network and acting as a gateway for the computer system, and wherein the network interface resources comprise at least one network interface card (NIC).

12. The method of claim 11 wherein the virtual router further comprises a plurality of routers, one of which is designated as the primary router for the virtual router in accordance with a virtual router protocol, and wherein the primary router is the source of the expected advertisement messages.

13. The method of claim 12 wherein said detecting further comprises maintaining a context for each team member comprising data derived from the advertisement messages received by the team member.

14. The method of claim 13 wherein said detecting further comprises distinguishing between expected advertisement messages received by the team members from the primary router and advertisement messages received from a different one of the plurality of routers comprising the virtual router based on a comparison of data stored in the respective contexts of each team member.

15. The method of claim 13 wherein said detecting further comprises distinguishing between expected advertisement messages received by the team members from the primary router and advertisement messages received from a different virtual router that is not the gateway for the computer system based on a source address assigned to the gateway virtual router.

16. The method of claim 1 wherein said configuring further comprises programming each of the team members with a multicast address assigned to the expected network management frames.

17. A method comprising:
detecting a break in connectivity between a core network and two or more operational paths comprising a contiguous local area network segment of a local area network, each of the two or more paths coupling at least one member of a team of network interface resources of an end-node computer system of the local area network to the core network, said detecting comprising:
configuring each member of the team to receive network management frames transmitted by one or more devices residing near or within the core network; and
identifying one of the two or more operational paths as isolated from the core network whenever the at least one member of the team coupled to that path fails to receive an expected one of the network management frames within a predetermined time period.

18. The method of claim 17 wherein said configuring comprises:
configuring each of the members of the team to receive, via a teaming driver, the network management frames transmitted by the one or more devices residing near or within the core network; and
programming the team members with one or more multicast addresses assigned to the network management frames.

19. The method of claim 18 wherein said identifying further comprises:
maintaining a context for each of the team members comprising data derived from the network management frames received by each team member; and
tracking time intervals between receipt of the expected network management frames for each team member.

20. The method of claim 19 wherein said identifying further comprises comparing the contexts for the team members to determine if the network management frames are expected network management frames.

21. The method of claim 19 wherein the expected network management frames are configuration messages transmitted by a device designated as a Spanning Tree root for the layer 2 network.

22. The method of claim 19 wherein the expected network management frames are virtual router advertisement messages transmitted by a router designated as a primary for a virtual router assigned to be a gateway for the computer system.

23. A method comprising:
monitoring connectivity between a virtual router residing in a core network and two or more operational paths comprising a contiguous local area network segment of a local area network, each of the two or more operational paths coupling at least one member of a team of network interface resources of an end-node computer system of the local area network to the virtual router, the virtual router acting as a gateway for the end-node computer system;
said monitoring comprising:
configuring each of the members of the team to receive, via a teaming driver of the end-node computer system, virtual router advertisement messages transmitted by one or more of a plurality of routers comprising the virtual router; and
detecting a break in connectivity between one of the paths of the local area network segment and one of the plurality of routers designated as a primary for the virtual router whenever the at least one member of the team coupled to that path fails to receive an expected one of the advertisement messages from the primary within a predetermined time period.

24. The method of claim 23 wherein said configuring further comprises programming the team members with one or more multicast addresses assigned to the advertisement messages, and wherein the two or more operational paths comprise two or more active operational paths, and wherein the network interface resources comprise at least one network interface card (NIC).

25. The method of claim 24 wherein said detecting further comprises:
maintaining a context for each of the team members comprising data derived from the advertisement messages received by each team member; and
tracking time intervals between receipt of the expected advertisement messages for each team member.

26. An end-node computer system-in a local area network and that monitors connectivity between a core network and two or more operational paths comprising a contiguous local area network segment of the local area network, each of the two or more operational paths coupling at least one member of a team of network interface resources of the computer system to the core network, said computer system comprising:
means for configuring each of the members of the team to receive network management frames transmitted by one or more devices residing near or within the core network; and
means for detecting a break in the connectivity between a path of the contiguous local area network segment and the core network whenever the at least one member of the team coupled to that path fails to receive an expected one of the network management frames within a predetermined time period.

27. The computer system of claim 26 further comprising means for reconfiguring the team whenever an active member of the team is coupled to one of the paths of the local area network segment having a detected break in connectivity with the core network, and wherein the two or more operational paths comprise two or more active operational paths.

28. The computer system of claim 26 wherein the expected network management frames are Spanning Tree configuration messages transmitted by a network device elected to be the root for the local area network segment.

29. The computer system of claim 27 wherein said means for detecting a break in the connectivity between one of the paths and the core network further comprises means for distinguishing between configuration messages received by the team members from the root device for the contiguous local area network segment and configuration messages received from another device that has established itself as the root for the path because of the detected break.

30. The computer system of claim 26 wherein the expected network management frames are virtual router advertisement messages transmitted by a virtual router residing in the core network and acting as a gateway for the computer system.

31. The computer system of claim 30 wherein the virtual router further comprises a plurality of routers, one of which is designated as the primary router for the virtual router in accordance with a virtual router protocol, and wherein the primary router is the source of the expected advertisement messages.

32. The computer system of claim 31 wherein said means for detecting further comprises means for maintaining a context for each team member comprising data derived from the advertisement messages received by the team member.

33. The computer system of claim 32 wherein said means for detecting further comprises means for distinguishing between expected advertisement messages received by the team members from the primary router and advertisement messages received from a different one of the plurality of routers comprising the virtual router based on a comparison of data stored in the respective contexts of each team member.

34. The computer system of claim 32 wherein said means for detecting further comprises means for distinguishing between expected advertisement messages received by the team members from the primary router and advertisement messages received from a different virtual router that is not the gateway for the computer system based on a source address assigned to the gateway virtual router.

35. An end-node computer system of a local area network and that detects a break in connectivity between a core network and two or more active operational paths comprising a contiguous local area network segment of the local area network, each of the two or more active operational paths coupling at least one member of a team of network interface resources of the end-node computer system to the core network, said end-node computer system comprising:
means for configuring each of the members of the team to receive network management frames transmitted by one or more devices residing near or within the core network wherein said means for configuring further comprises means for programming the team members with one or more multicast addresses assigned to the network management frames; and
means for identifying one of the two or more active operational paths as isolated from the core network whenever the at least one member of the team coupled to that path fails to receive an expected one of the network management frames within a predetermined time period.

36. The computer system of claim 35 wherein said means for configuring further comprises means for programming the team members with one or more multicast addresses assigned to the network management frames, and wherein the end-node computer system comprises a database server or a personal computer (PC).

37. The computer system of claim 35 wherein said means for identifying further comprises:
means for maintaining a context for each of the team members comprising data derived from the network management frames received by each team member; and
means for tracking time intervals between receipt of the expected network management frames for each team member.

38. The computer system of claim 37 wherein said means for identifying further comprises comparing the contexts for the team members to determine if the network management frames are expected network management frames.

39. The computer system of claim 37 wherein the expected network management frames are configuration messages transmitted by a device designated as a Spanning Tree root for the local area network.

40. The computer system of claim 37 wherein the expected network management frames are virtual router advertisement messages transmitted by a router designated as a primary for a virtual router assigned to be a gateway for the computer system.

41. An end-node computer system in a local area network and that monitors connectivity between a virtual router residing in a core network and two or more operational paths comprising a contiguous local area network segment of the local area network, each of the two or more operational paths coupling at least one member of a team of network interface resources of the computer system to the virtual router, the virtual router acting as a gateway for the computer system, said computer system comprising:
means for configuring each of the members of the team to receive virtual router advertisement messages transmitted by one or more of a plurality of routers comprising the virtual router; and
means for detecting a break in connectivity between one of the paths of the local area network segment and one of the plurality of routers designated as a primary for the virtual router whenever the at least one member of the team coupled to that path fails to receive an expected one of the advertisement messages from the primary within a predetermined time period.

42. The computer system of claim 41 wherein said means for configuring further comprises means for programming the team members with one or more multicast addresses assigned to the advertisement messages, and wherein the computer system comprises a keyboard and a display.

43. The computer system of claim 42 wherein said means for detecting further comprises:
means for maintaining a context for each of the team members comprising data derived from the advertisement messages received by each team member; and
means for tracking time intervals between receipt of the expected advertisement messages for each team member.

* * * * *